United States Patent
Yang et al.

(10) Patent No.: US 11,646,854 B2
(45) Date of Patent: May 9, 2023

(54) DISTRIBUTED RESOURCE UNIT SIGNALING

(71) Applicant: QUALCOMM Incorporated, San Diego, CA (US)

(72) Inventors: Lin Yang, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 17/245,471

(22) Filed: Apr. 30, 2021

(65) Prior Publication Data

US 2022/0353049 A1 Nov. 3, 2022

(51) Int. Cl.
*H04W 56/00* (2009.01)
*H04L 5/00* (2006.01)
*H04W 72/0446* (2023.01)
*H04W 80/02* (2009.01)

(52) U.S. Cl.
CPC .......... *H04L 5/0094* (2013.01); *H04L 5/0039* (2013.01); *H04W 72/0446* (2013.01); *H04W 80/02* (2013.01)

(58) Field of Classification Search
CPC ............... H04L 5/0094; H04L 5/0039; H04W 72/0446; H04W 80/02
USPC .......................................................... 370/329
See application file for complete search history.

(56) References Cited

U.S. PATENT DOCUMENTS

| | | | | |
|---|---|---|---|---|
| 2017/0311289 A1* | 10/2017 | Kim | ................... | H04W 74/0816 |
| 2020/0107393 A1* | 4/2020 | Chu | ..................... | H04L 1/0003 |
| 2021/0321293 A1* | 10/2021 | Chen | ................... | H04L 27/2603 |
| 2022/0247544 A1* | 8/2022 | Park | ..................... | H04L 5/0092 |

OTHER PUBLICATIONS

Cailian, D., et al., "IEEE 802.11 be Wi-Fi 7: New Challenges and Opportunities", IEEE Communications Surveys & Tutorials, IEEE, USA, vol. 22, No. 4, Jul. 29, 2020 (Jul. 29, 2020), XP011821374, pp. 2136-2166, DOI: 10.1109/COMST.2020.3012715 [retrieved on Nov. 19, 2020] Section II, Subsection "B. Multi-RU Support", Paragraph 3 Section II, Subsection "C. EHT Preamble Design", Paragraph 4.

(Continued)

*Primary Examiner* — Sai Ming Chan
(74) *Attorney, Agent, or Firm* — Holland & Hart LLP

(57) ABSTRACT

This disclosure provides methods, devices and systems for increasing the transmit power of wireless communication devices operating on power spectral density (PSD)-limited wireless channels. Some implementations more specifically relate to trigger frame and physical layer convergence protocol (PLCP) protocol data unit (PPDU) designs that support distributed transmission. In some implementations, an access point (AP) may transmit a trigger frame soliciting a trigger-based (TB) PPDU from a wireless station (STA), where the trigger frame carries RU allocation information indicating a number (N) of tones allocated for the STA and carries tone distribution information indicating whether the N tones are allocated for a contiguous transmission or a distributed transmission. In some other implementations, an AP or a STA may transmit a PPDU carrying distributed signaling information indicating whether the PPDU is transmitted as a contiguous transmission or a distributed transmission.

29 Claims, 25 Drawing Sheets

(56) References Cited

OTHER PUBLICATIONS

Hu, M., et al., "Multi-RU Indication in Trigger Frame", IEEE 802.11-20/0416r0, Mar. 15, 2020 (Mar. 15, 2020), XP055869663, pp. 1-14, Slides 3, 6, 8.
International Search Report and Written Opinion—PCT/US2022/019092—ISA/EPO—dated Jun. 27, 2022.

* cited by examiner

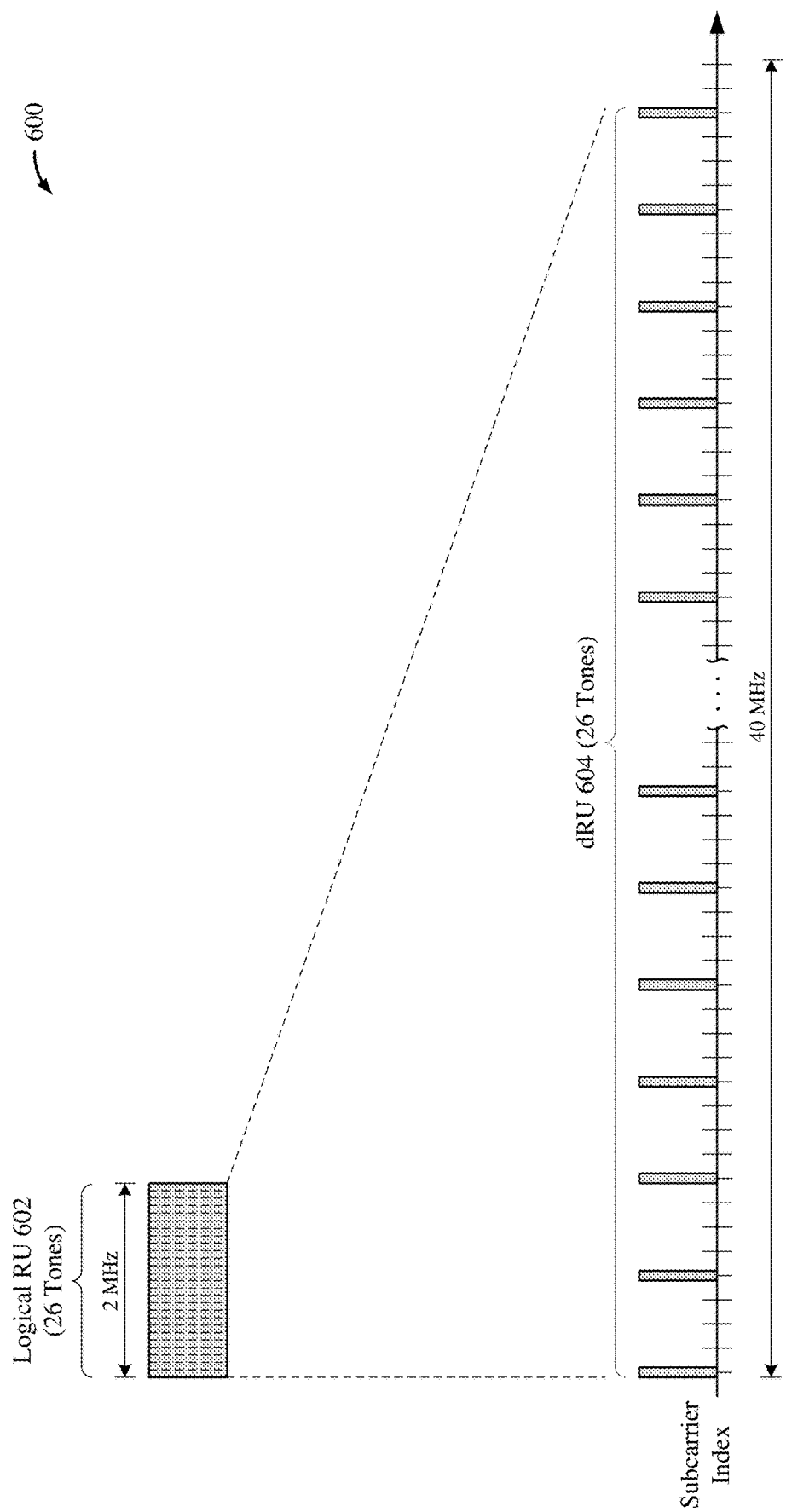

| Bit Position: | B0  B3 | B4  B5 | B6  B8 | B9 | B10  B11 | B12 | B13  B16 | B17  B17+N |
|---|---|---|---|---|---|---|---|---|
| 1700 → | Spatial Reuse | GI+LTF Size | Number of EHT-LTF Symbols | LDPC Extra Symbol Segment | Pre-FEC Padding Factor | PE Disambiguity | Disregard | ... |
| # Bits: | 4 | 2 | 3 | 1 | 2 | 1 | 4 | |

*Figure 17*

DISTRIBUTED RESOURCE UNIT SIGNALING

TECHNICAL FIELD

This disclosure relates generally to wireless communication, and more specifically to signaling for distributed resource units (dRUs) used in wireless communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some instances, APs and STAs may be subject to power spectral density (PSD) limits. For example, some APs and STAs that operate in the 6 gigahertz (GHz) frequency band may be required to conform to a low power indoor (LPI) power class, which limits the transmit power of APs and STAs (in the 6 GHz band) to 5 decibel-milliwatts per megahertz (dBm/MHz) and −1 dBm/MHz, respectively. In other words, transmit power in the 6 GHz band is PSD-limited on a per-MHz basis. Such PSD limits can undesirably reduce the range of wireless communications and may reduce packet detection and channel estimation capabilities of APs and STAs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving a trigger frame soliciting a trigger-based (TB) physical layer convergence protocol (PLCP) protocol data unit (PPDU) from the wireless communication device, where the trigger frame carries resource unit (RU) allocation information indicating a number (N) of tones allocated for the wireless communication device and carries tone distribution information indicating whether the N tones are allocated for a contiguous transmission or a distributed transmission; mapping the N tones to N subcarrier indices associated with a wireless channel according to a first tone plan or a second tone plan based on whether the N tones are allocated for a contiguous transmission or a distributed transmission, respectively; and transmitting the TB PPDU over the wireless channel based on the mapping of the N tones to the N subcarrier indices.

The N tones may represent one or more RUs. In some implementations, each of the one or more RUs may be mapped to a respective set of contiguous subcarrier indices according to the first tone plan. In some other implementations, each of the one or more RUs may be mapped to noncontiguous subcarrier indices according to the second tone plan.

In some implementations, the RU allocation information and the tone distribution information may be carried in a user information field that carries information specific to the wireless communication device. In some aspects, the RU allocation information may be indicated by a value of an RU allocation subfield of the user information field and the tone distribution information may be indicated by a value of a distributed transmission bit.

In some other implementations, the RU allocation information may be carried in a user information field and the tone distribution information may be carried in a common information field, or a special user information field, that carries information common to each user associated with the trigger frame. In some aspects, the RU allocation information may be indicated by a value of an RU allocation subfield of the user information field and the tone distribution information may be indicated by a value of a distributed transmission bit. In some other aspects, the RU allocation information may be indicated by a value of an RU allocation subfield of the user information field and the tone distribution information may comprise a bitmap, where each bit of the bitmap indicates whether a respective subchannel of the wireless channel is allocated for contiguous transmissions or distributed transmissions.

In some implementations, the TB PPDU may include a physical layer preamble having a universal signal field (U-SIG) that carries distributed signaling information indicating whether the N tones are mapped to the N subcarrier indices according to the first tone plan or the second tone plan.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a trigger frame soliciting a TB PPDU from the wireless communication device, where the trigger frame carries RU allocation information indicating a number (N) of tones allocated for the wireless communication device and carries tone distribution information indicating whether the N tones are allocated for a contiguous transmission or a distributed transmission; mapping the N tones to N subcarrier indices associated with a wireless channel according to a first tone plan or a second tone plan based on whether the N tones are allocated for a contiguous transmission or a distributed transmission, respectively; and transmitting the TB PPDU over the wireless channel based on the mapping of the N tones to the N subcarrier indices.

Another innovative aspect of the subject matter described in this disclosure can be implemented as a method of wireless communication. The method may be performed by a wireless communication device, and may include receiving a PPDU having a physical layer preamble followed by a data payload, where the physical layer preamble carries bandwidth information indicating a bandwidth of a wireless channel associated with the PPDU and carries distributed signaling information indicating whether the PPDU is transmitted as a contiguous transmission or a distributed transmission; demapping the PPDU from a number (N) of subcarrier indices associated with the wireless channel according to a first tone plan or a second tone plan based on whether the PPDU is transmitted as a contiguous transmission or a distributed transmission, respectively; and recovering the data payload based on the demapped PPDU.

In some implementations, the distributed signaling information may be indicated by a value of a distributed signaling bit. In some other implementations, the distributed signaling information may comprise a bitmap, where each bit of the bitmap indicates whether a respective subchannel of the wireless channel is associated with contiguous transmissions or distributed transmissions.

In some implementations, the PPDU may be demapped from one or more sets of contiguous subcarrier indices according to the first tone plan, where each of the one or more sets of contiguous subcarrier indices represents a respective RU. In some other implementations, the PPDU may be demapped from noncontiguous subcarrier indices according to the second tone plan.

In some implementations, the distributed signaling information may be carried in a U-SIG that carries information for interpreting one or more subsequent fields of the physical layer preamble. In some other implementations, the distributed signaling information may be carried in a common field of a non-legacy signal field that immediately follows a U-SIG in the physical layer preamble, where the common field carries information common to each user associated with the PPDU. Still further, in some implementations, the distributed signaling information may be carried in a user field of a non-legacy signal field that immediately follows a U-SIG in the physical layer preamble, where the user field carries information specific to the wireless communication device.

In some implementations, the method may further include transmitting a trigger frame soliciting the PPDU, where the trigger frame carries tone distribution information indicating whether the wireless channel is allocated for a contiguous transmission or a distributed transmission, and where the PPDU being received responsive to the trigger frame.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a PPDU having a physical layer preamble followed by a data payload, where the physical layer preamble carries bandwidth information indicating a bandwidth of a wireless channel associated with the PPDU and carries distributed signaling information indicating whether the PPDU is transmitted as a contiguous transmission or a distributed transmission; demapping the PPDU from a number (N) of subcarrier indices associated with the wireless channel according to a first tone plan or a second tone plan based on whether the PPDU is transmitted as a contiguous transmission or a distributed transmission, respectively; and recovering the data payload based on the demapped PPDU.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 6A shows a frequency diagram depicting an example distributed tone mapping according to some implementations.

FIG. 17 shows a common field for a PPDU formatted in accordance with an existing PPDU format.

Like reference numbers and designations in the various drawings indicate like elements.

DETAILED DESCRIPTION

Figure 1:
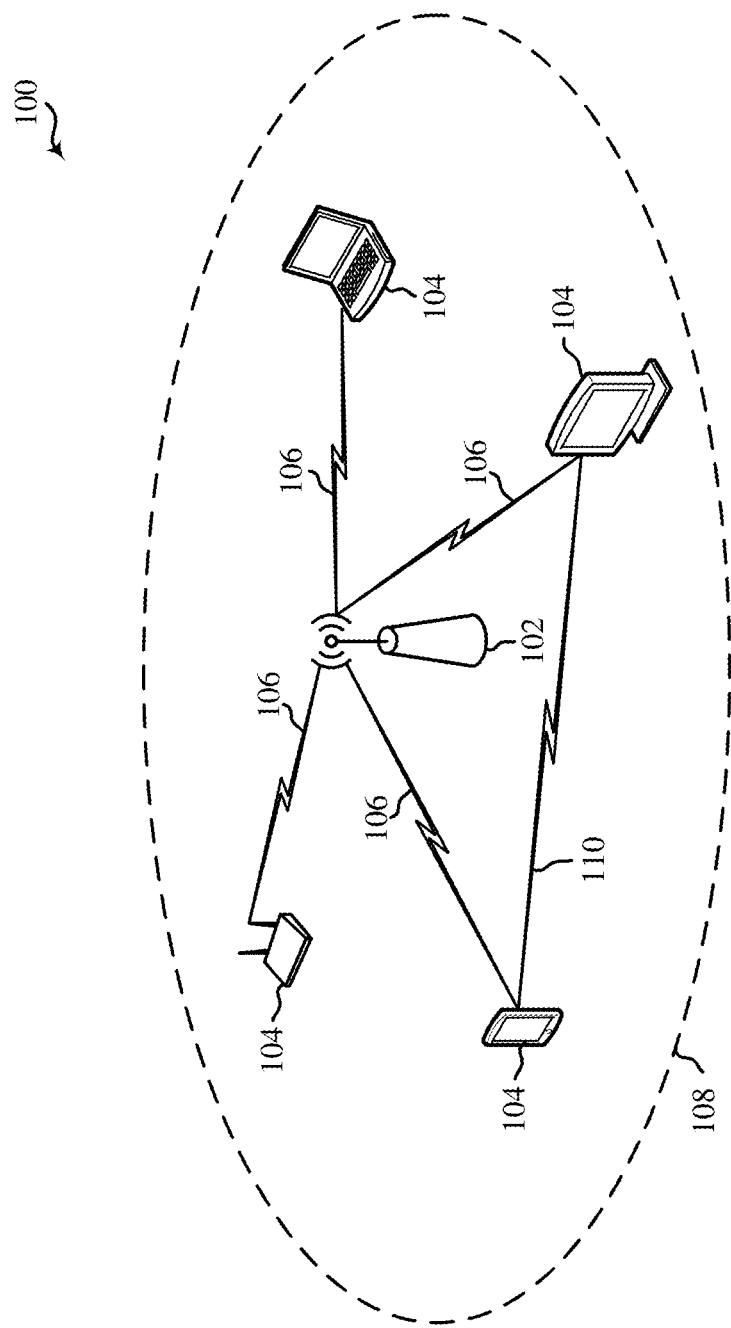
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to increasing the transmit power of wireless communication devices operating on power spectral density (PSD)-limited wireless channels, and more particularly, to trigger frame and physical layer convergence protocol (PLCP) protocol data unit (PPDU) designs that support distributed transmission. As used herein, the term "distributed transmission" refers to the transmission of a PPDU on noncontiguous tones (or subcarriers) spanning a wireless channel. In contrast, the term "contiguous transmission" refers to the transmission of a PPDU on one or more sets of contiguous tones that represent one or more resource units (RUs), respectively, as defined by existing versions of the IEEE 802.11 standard. In some implementations, an access point (AP) may transmit a trigger frame soliciting a trigger-based (TB) PPDU from one or more wireless stations (STAs), where the trigger frame carries RU allocation information indicating a number (N) of tones allocated for the STA and carries tone distribution information indicating whether the N tones are allocated for a contiguous transmission or a distributed transmission. In some other implementations, an AP or a STA may transmit a PPDU carrying distributed signaling information indicating whether the PPDU is transmitted as a contiguous transmission or a distributed transmission.

Particular implementations of the subject matter described in this disclosure can be implemented to realize one or more of the following potential advantages. Distributed transmission provides greater flexibility in medium utilization for PSD-limited wireless channels. As described above, the LPI power class limits the transmit power of APs and STAs in the 6 GHz band to 5 dBm/MHz and −1 dBm/MHz, respectively. By allowing a wireless communication device to distribute the tones allocated for the transmission of a PPDU across noncontiguous subcarrier indices of a wireless channel, aspects of the present disclosure may increase the overall transmit power of the PPDU without exceeding the PSD limits of the wireless channel. For example, the distributed tone plan may reduce the total number of tones modulated by the device on any 1-MHz subchannel of the wireless channel. As a result, the wireless communication device may increase its per-tone transmit power, without exceeding the PSD limits. In some implementations, distributed transmissions by multiple wireless communication devices can be multiplexed onto a shared wireless channel thus increasing the transmit power of each device without sacrificing spectral efficiency. Such increases in transmit power can be combined with any modulation and coding scheme (MCS) to increase the range and throughput of wireless communications on PSD-limited wireless channels. Distributed transmissions also may improve the packet detection and channel estimation capabilities of the wireless communication devices.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
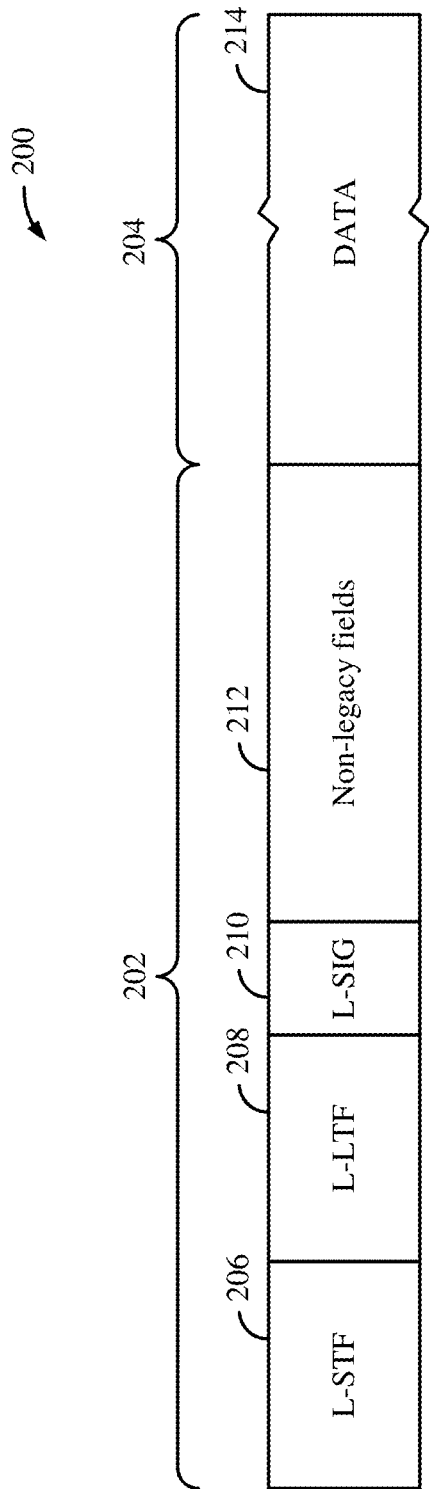
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
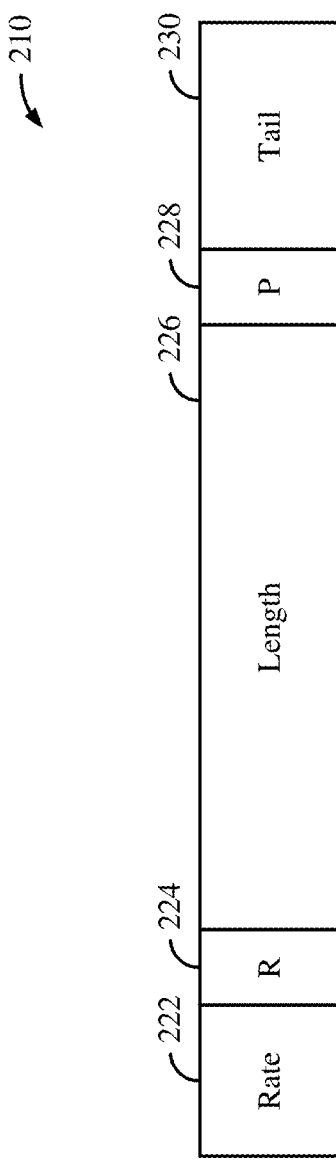
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
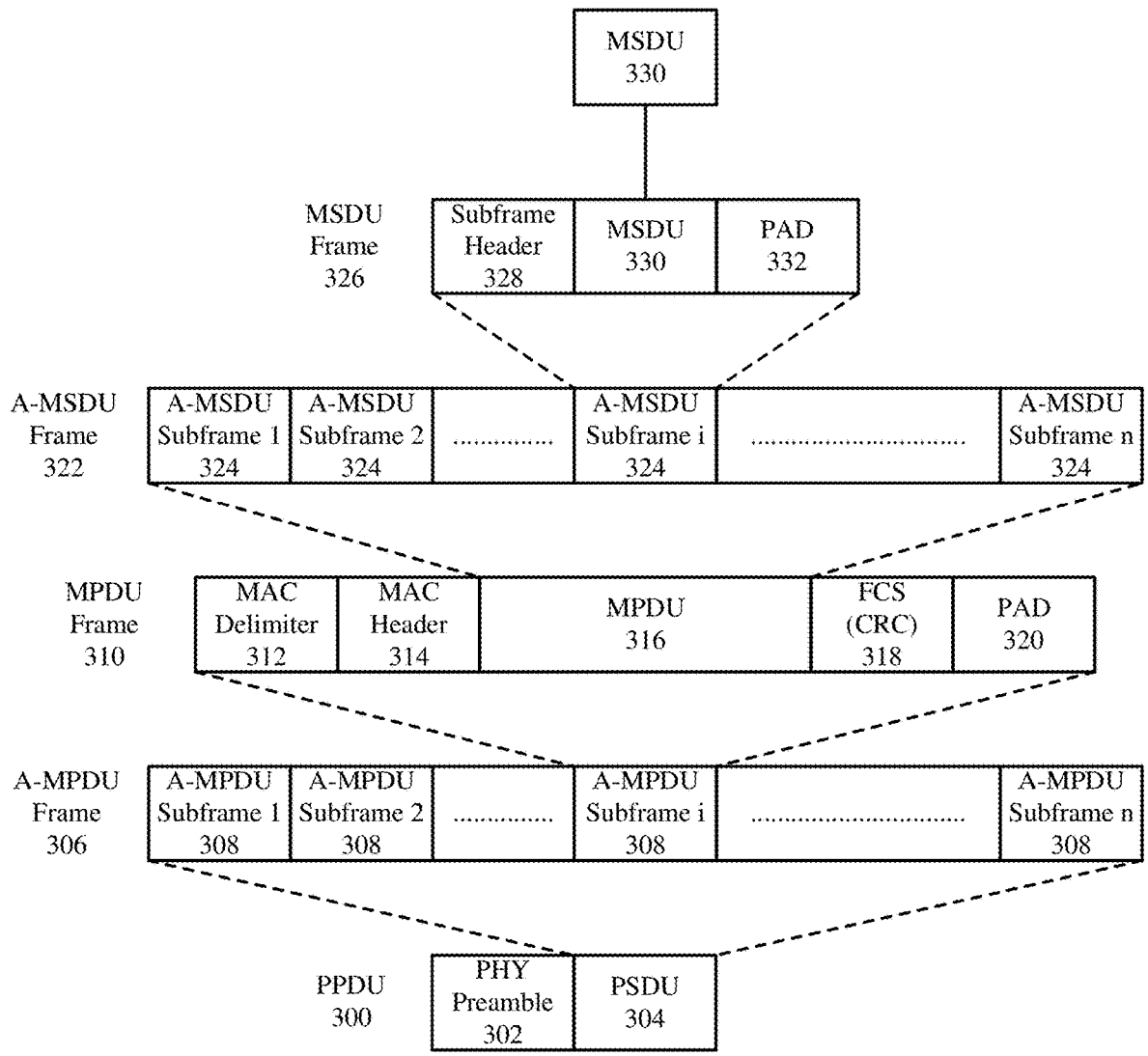
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
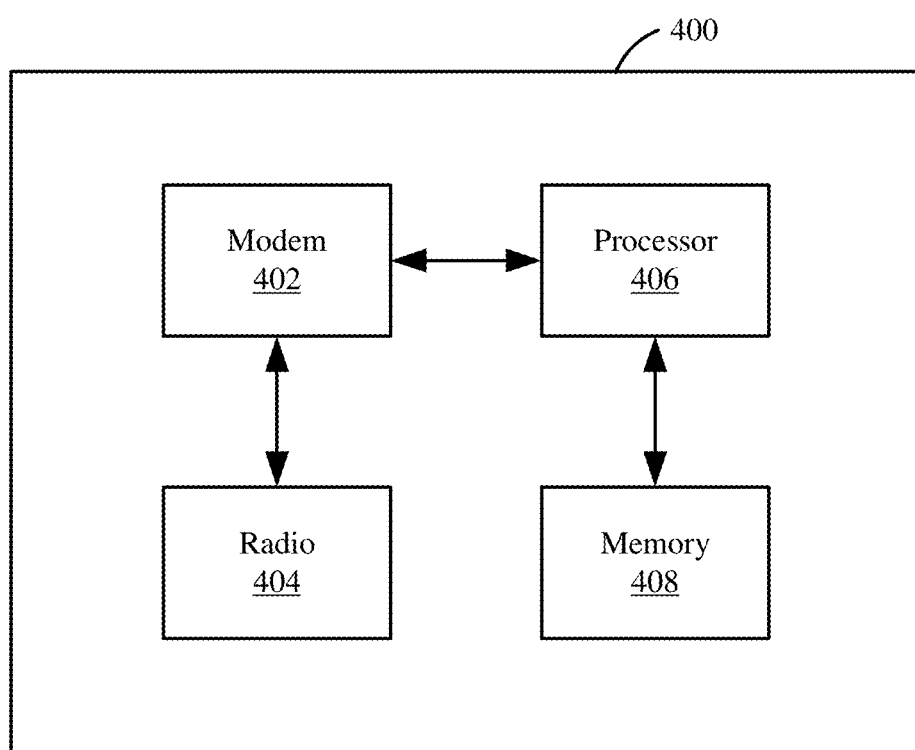
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
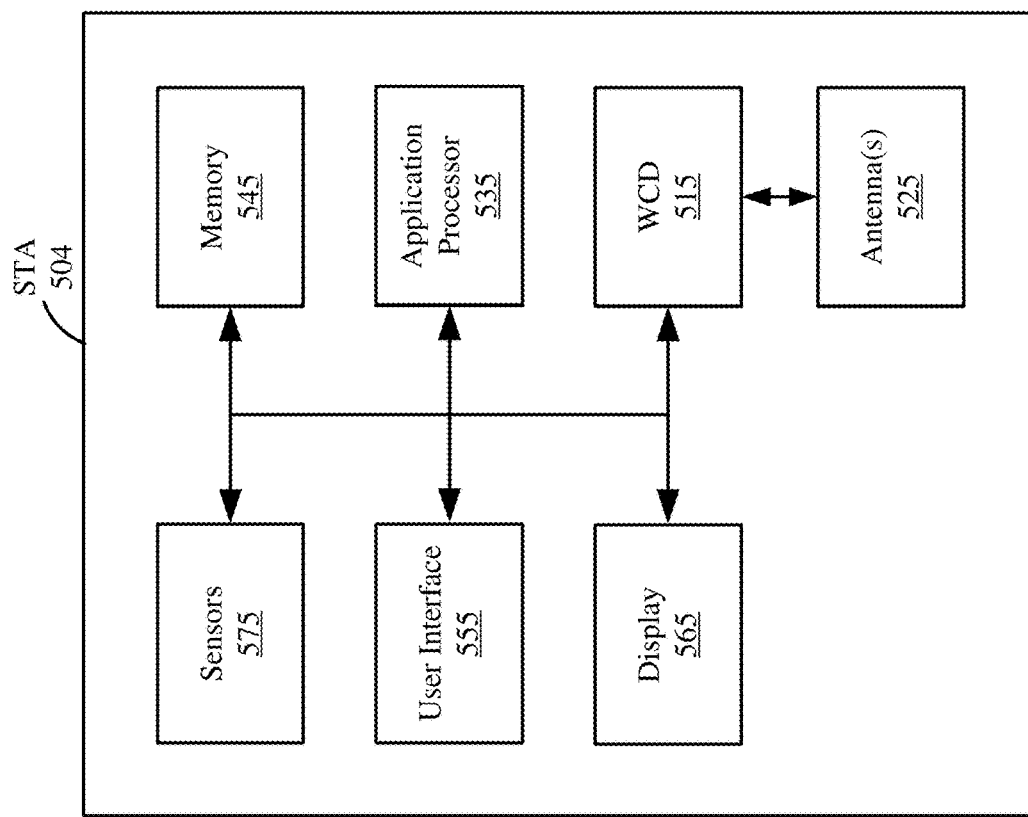
FIG. 5B shows a block diagram of an example STA.
Figure 5A:
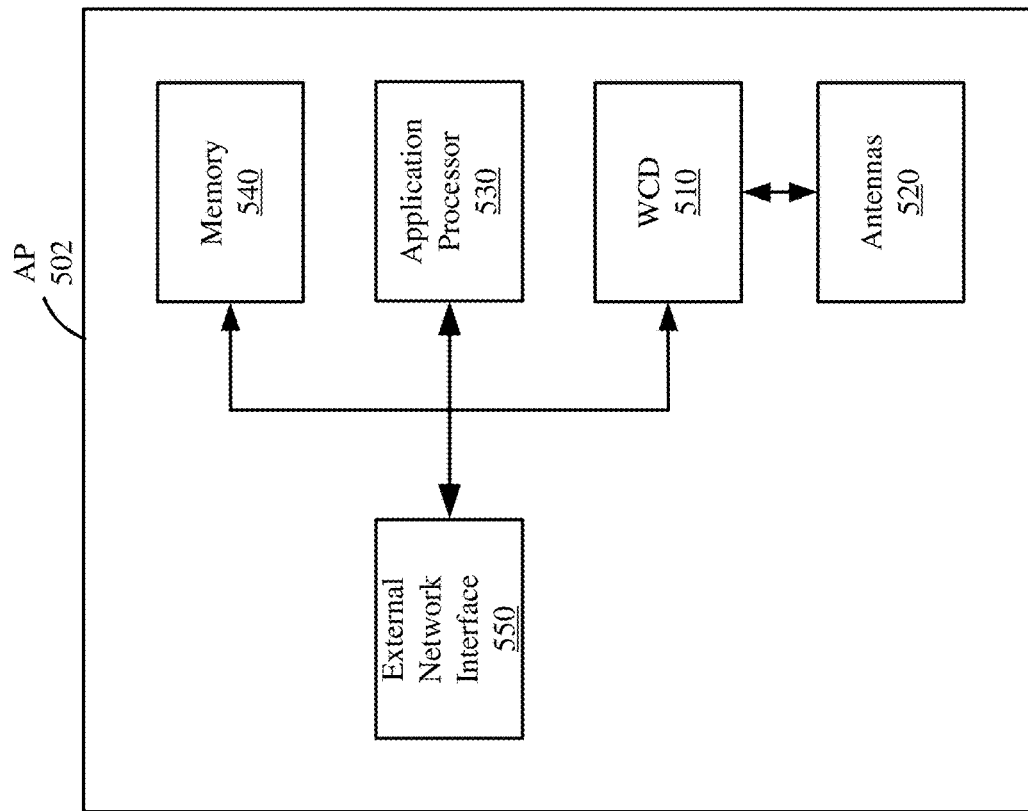
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, some APs and STAs may be subject to power spectral density (PSD) limits. For example, some APs and STAs that operate in the 6 GHz frequency band may be required to conform to a low power indoor (LPI) power class, which limits the transmit power of APs and STAs (in the 6 GHz band) to 5 dBm/MHz and −1 dBm/MHz, respectively. In other words, transmit power in the 6 GHz band is PSD-limited on a per-MHz basis. Such PSD limits can undesirably reduce the range of wireless communications and may reduce packet detection and channel estimation capabilities of APs and STAs.

Various aspects relate generally to increasing the transmit power of wireless communication devices operating on PSD-limited wireless channels, and more particularly, to trigger frame and PPDU designs that support distributed transmission. As used herein, the term "distributed transmission" refers to the transmission of a PPDU on noncontiguous tones (or subcarriers) spanning a wireless channel. In contrast, the term "contiguous transmission" refers to the transmission of a PPDU on one or more sets of contiguous tones that represent one or more RUs, respectively, as defined by existing versions of the IEEE 802.11 standard. In some implementations, an AP may transmit a trigger frame soliciting a TB PPDU from one or more STAs, where the trigger frame carries RU allocation information indicating a number (N) of tones allocated for the STA and carries tone distribution information indicating whether the N tones are allocated for a contiguous transmission or a distributed transmission. In some other implementations, an AP or a STA may transmit a PPDU carrying distributed signaling information indicating whether the PPDU is transmitted as a contiguous transmission or a distributed transmission.

Particular implementations of the subject matter described in this disclosure can be implemented to realize one or more of the following potential advantages. Distributed transmission provides greater flexibility in medium utilization for PSD-limited wireless channels. As described above, the LPI power class limits the transmit power of APs and STAs in the 6 GHz band to 5 dBm/MHz and −1 dBm/MHz, respectively. By allowing a wireless communication device to distribute the tones allocated for the transmission of a PPDU across noncontiguous subcarrier indices of a wireless channel, aspects of the present disclosure may increase the overall transmit power of the PPDU without exceeding the PSD limits of the wireless channel. For example, the distributed tone plan may reduce the total number of tones modulated by the device on any 1-MHz subchannel of the wireless channel. As a result, the wireless communication device may increase its per-tone transmit power without exceeding the PSD limits. In some implementations, distributed transmissions by multiple wireless communication devices can be multiplexed onto a shared wireless channel thus increasing the transmit power of each device without sacrificing spectral efficiency. Such increases in transmit power can be combined with any modulation and coding scheme (MCS) to increase the range and throughput of wireless communications on PSD-limited wireless channels. Distributed transmissions also may improve the packet detection and channel estimation capabilities of the wireless communication devices.

FIG. 6A shows a frequency diagram 600 depicting an example distributed tone mapping according to some implementations. More specifically, FIG. 6A shows an example mapping of a logical RU 602 to a distributed RU (dRU) 604. The logical RU 602 represents a number of tones or subcarriers that are allocated for the transmission of a PPDU. In contrast, the dRU 604 represents the physical resources (identified by subcarrier indices) that are modulated to transmit the PPDU.

Existing versions of the IEEE 802.11 standard define a number of RUs and multiple RUs (MRUs) of various sizes that map to contiguous tones or subcarriers spanning a frequency bandwidth (or wireless channel). For example, a 242-tone RU maps to 242 contiguous subcarrier indices spanning a 20 MHz bandwidth. Similarly, a 484+242-tone MRU maps to 484 contiguous subcarrier indices spanning a 40 MHz bandwidth and to 242 contiguous subcarrier indices spanning a 20 MHz bandwidth. As used herein, the term "regular RU" (or rRU) refers to any RU or MRU configuration that is supported by existing versions of the IEEE 802.11 standard. Similarly, the term "legacy tone plan" refers to existing tone mapping techniques that can be used to map a logical RU to one or more sets of contiguous subcarrier indices associated with a wireless channel, for example, to construct an rRU.

In the example of FIG. 6A, the logical RU 602 includes 26 tones. In some implementations, the logical RU 602 can be mapped to an rRU according to a legacy tone plan (not shown for simplicity). In such implementations, the logical RU 602 is mapped to 26 contiguous or consecutive subcarrier indices spanning a 2 MHz subchannel. However, in this configuration, the transmit power of the wireless communication device may be severely limited based on the PSD of the wireless channel. For example, the LPI power class limits the transmit power of APs and STAs to 5 dBm/MHz and −1 dBm/MHz, respectively, in the 6 GHz band. As such, the per-tone transmit power of the logical RU 602 is limited by the number of tones mapped to each 1 MHz subchannel of a wireless channel.

Aspects of the present disclosure recognize that the per-tone transmit power of the logical RU 602 can be increased by distributing the tones across a wider bandwidth. Increasing the per-tone transmit power can also increase the overall transmit power of the logical RU 602. Thus, in some other implementations, the logical RU 602 may be mapped to a set of noncontiguous subcarrier indices spanning a wider-bandwidth channel. As used herein, the term "distributed RU" (or dRU) refers to any logical RU that is distributed across a set of noncontiguous subcarrier indices. Similarly, the term "distributed tone plan" refers to new tone mapping techniques that can be used to map a logical RU to a set of noncontiguous subcarrier indices associated with a wireless channel, for example, to construct a dRU.

With reference for example to FIG. 6A, the logical RU 602 is mapped to the dRU 604 according to a distributed tone plan. More specifically, the logical RU 602 is mapped to 26 noncontiguous subcarrier indices spread across a 40 MHz wireless channel. Compared to the tone mapping described above with respect to the legacy tone plan, the distributed tone mapping depicted in FIG. 6A effectively reduces the number of tones (of the logical RU 602) in each 1 MHz subchannel. For example, each of the 26 tones can be mapped to a different 1 MHz subchannel of the 40 MHz channel. As a result, each AP or STA implementing the distributed tone mapping of FIG. 6A can maximize its per-tone transmit power (which may maximize the overall transmit power of the logical RU 602).

In some implementations, a transmitting device (such as an AP) may include a distributed tone mapper that maps the logical RU 602 to the dRU 604 in the frequency domain (such as described with reference to FIG. 6A). The dRU 604 is then converted to a time-domain signal (such as by an inverse fast Fourier transform (IFFT)) for transmission over a wireless channel. A receiving device (such as a STA) receives the time-domain signal over the wireless channel and converts the time-domain signal back to the dRU 604 (such as by a fast Fourier transform (FFT)). In some implementations, the receiving device may include a distributed tone demapper that demaps the dRU 604 to the logical RU 602. In other words, the distributed tone demapper reverses the mapping performed by the distributed tone mapper at the transmitting device. The receiving device can then recover the information carried (or modulated) on the logical RU 602 as a result of the demapping.

In the example of FIG. 6A, the logical RU 602 is distributed evenly across a 40 MHz wireless channel. However, in actual implementations, the logical RU 602 can be mapped to any suitable pattern of noncontiguous subcarrier indices. For example, in some aspects, the distance between any pair of modulated tones may be less than or greater than the distances depicted in FIG. 6A. In some other aspects, a subset of two or more tones of the logical RU 602 may be mapped to contiguous subcarrier indices. Still further, in some aspects, multiple logical RUs may be mapped to interleaved subcarrier indices of a shared wireless channel.

Figure 6B:
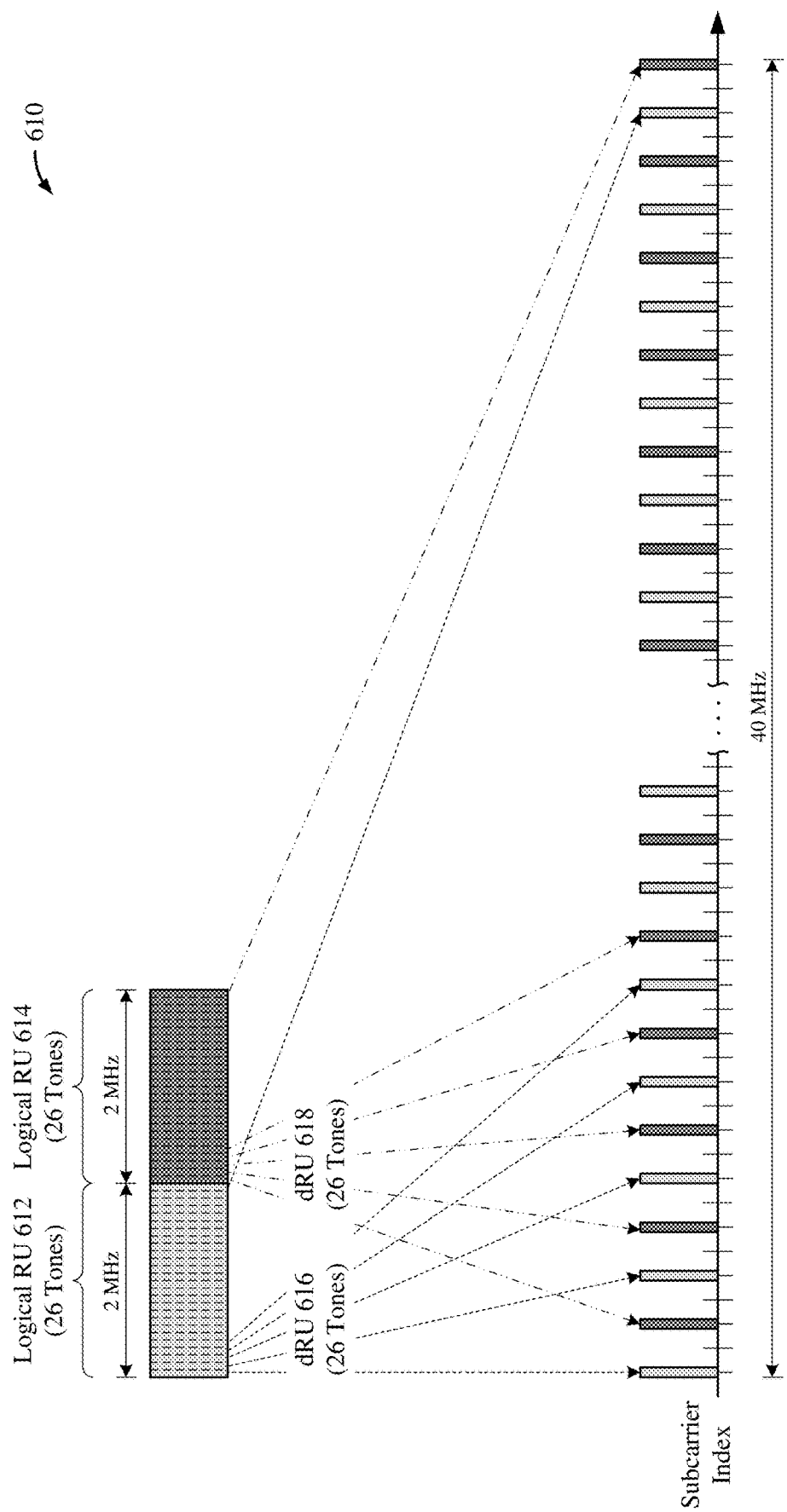
FIG. 6B shows another frequency diagram depicting an example distributed tone mapping according to some implementations.

FIG. 6B shows another frequency diagram 610 depicting an example distributed tone mapping according to some implementations. More specifically, FIG. 6B shows an example mapping of logical RUs 612 and 614 to dRUs 616 and 618, respectively. In some implementations, an AP may allocate the logical RUs 612 and 614 to first and second STAs, respectively, for the transmission of a TB PPDU. In some other implementations, an AP may transmit an MU PPDU to first and second STAs using the logical RUs 612 and 614, respectively.

In the example of FIG. 6B, each of the logical RUs 612 and 614 includes 26 tones. In some implementations, the logical RUs 612 and 614 are mapped to the dRUs 616 and 618, respectively, according to a distributed tone plan. More specifically, each of the logical RUs 612 and 614 is mapped to a respective set of 26 noncontiguous subcarrier indices spread across a 40 MHz wireless channel. Thus, as shown in FIG. 6B, the dRU 616 is interleaved with the dRU 618 across a shared 40 MHz wireless channel. Aspects of the present disclosure recognize that, by interleaving the dRUs 616 and 618, the per-tone transmit power of each dRU can be significantly increased without sacrificing spectral efficiency.

To support distributed transmissions, new packet designs and signaling are needed to indicate whether a PPDU is to be transmitted on tones spanning an rRU (according to a legacy tone plan) or a dRU (according to a distributed tone plan). For example, existing versions of the IEEE 802.11 standard define a trigger frame format which can be used to solicit the transmission of a TB PPDU from one or more STAs. The trigger frame allocates resources to the STAs for the transmission of the TB PPDU and indicates how the TB PPDU is to be configured for transmission. For example, the trigger frame may indicate a logical RU (or MRU) that is allocated for transmission in the TB PDDU. In some implementations, the trigger frame may be further configured to carry tone distribution information indicating whether the logical RU (or MRU) maps to an rRU or a dRU.

Figure 7:
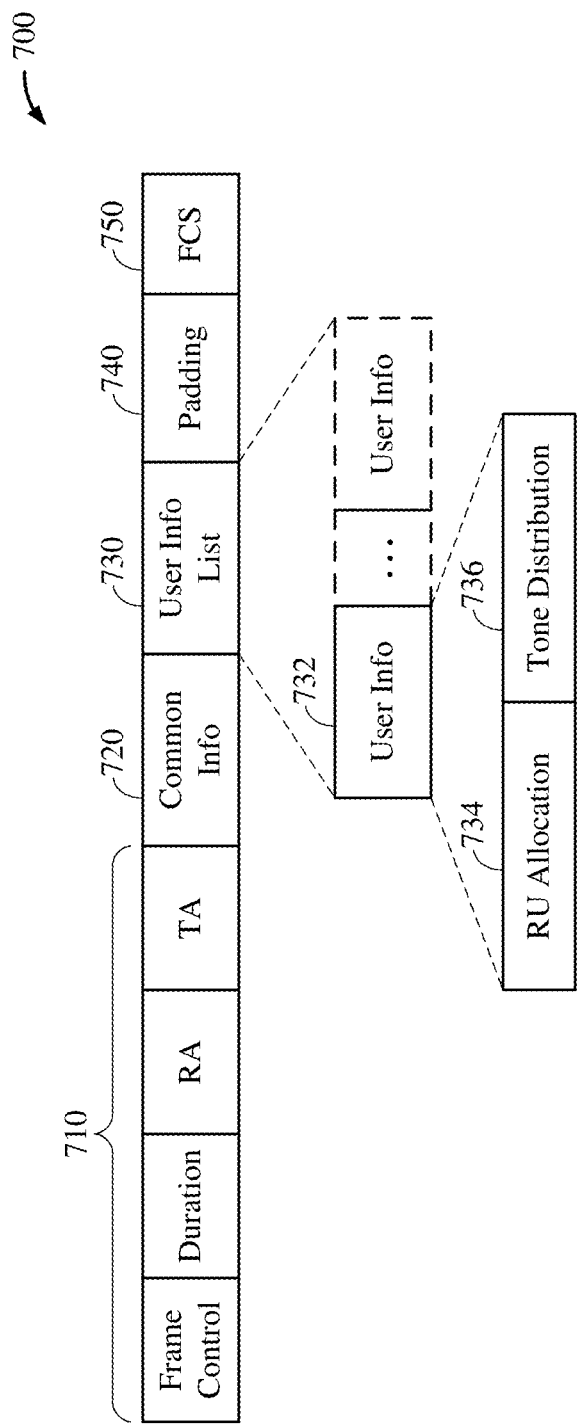
FIG. 7 shows an example trigger frame usable for communications between an AP and a number of STAs according to some implementations.

FIG. 7 shows an example trigger frame 700 usable for communications between an AP and a number of STAs according to some implementations. The trigger frame 700 may be used to solicit a TB PPDU from one or more STAs. With reference for example to FIG. 1, the AP 102 may transmit the trigger frame 700 to one or more of the STAs 104 to solicit a TB PPDU from the STAs. The trigger frame 700 may allocate one or more logical RUs (or MRUs) for transmission in the TB PPDU. In some implementations, each of the logical RUs may map to an rRU. In some other implementations, each of the logical RUs may map to a dRU. Still further, in some implementations, the logical RUs may map to a combination of rRUs and dRUs.

The trigger frame 700 includes a MAC header 710, a common information field 720, a user information list 730, zero or more padding bits 740, and an FCS 750. The MAC header 710 includes a frame control field, a duration field, a receiver address (RA) field, and a transmitter address (TA) field. The common information field 720 and user information list 730 carry configuration information which may be used by a receiving device to configure a TB PPDU to be transmitted in response to receiving the trigger frame 700. In some aspects, the user information list 730 may include one or more user information fields 732 each carrying per-user information for a respective user. In contrast, the common information field 620 may carry information that is common to all recipients of the trigger frame 600 (such as any users identified in the user information list 630).

In some implementations, each user information field 732 may carry RU allocation information 734 and tone distribution information 736. The RU allocation information 734 indicates a logical RU (or MRU) that is allocated for transmission in the TB PPDU and the tone distribution information 736 indicates whether the logical RU is allocated for a contiguous transmission or a distributed transmission. As described above, the logical RU represents a number (N) of tones on which a particular user or STA can transmit the TB PPDU. As such, the tone distribution information 736 may indicate whether the N tones represent an rRU or a dRU. Because the trigger frame 700 may include multiple user information fields 732 (to solicit a TB PPDU from multiple users), the tone distribution information 736 may apply only to the RU allocation information 734 in the same user information field 732. In some aspects, the tone distribution information 736 may be indicated by the value of a distributed transmission bit.

Aspects of the present disclosure recognize that the trigger frame 700 may include a number of reserved bits. Reserved bits represent unused bits that are reserved for future implementations of the IEEE 802.11 standard. In some aspects, one or more reserved bits in an earlier version or release of the IEEE 802.11 standard may be repurposed (to carry information) in a later version or release. For example, some reserved bits in the trigger frame 700 may be repurposed, in later versions or releases of the IEEE 802.11 standard, to expand a range of values that can be represented by existing fields in an earlier version or release. Some other reserved bits in the trigger frame 700 may be repurposed, in later versions or releases of the IEEE 802.11 standard, to convey information that is unrelated to any information conveyed in the earlier version or release (or remains unused in the later version or release). In some implementations, one or more of the reserved bits in the trigger frame 700 may be repurposed to carry the tone distribution information 736.

Figure 8:
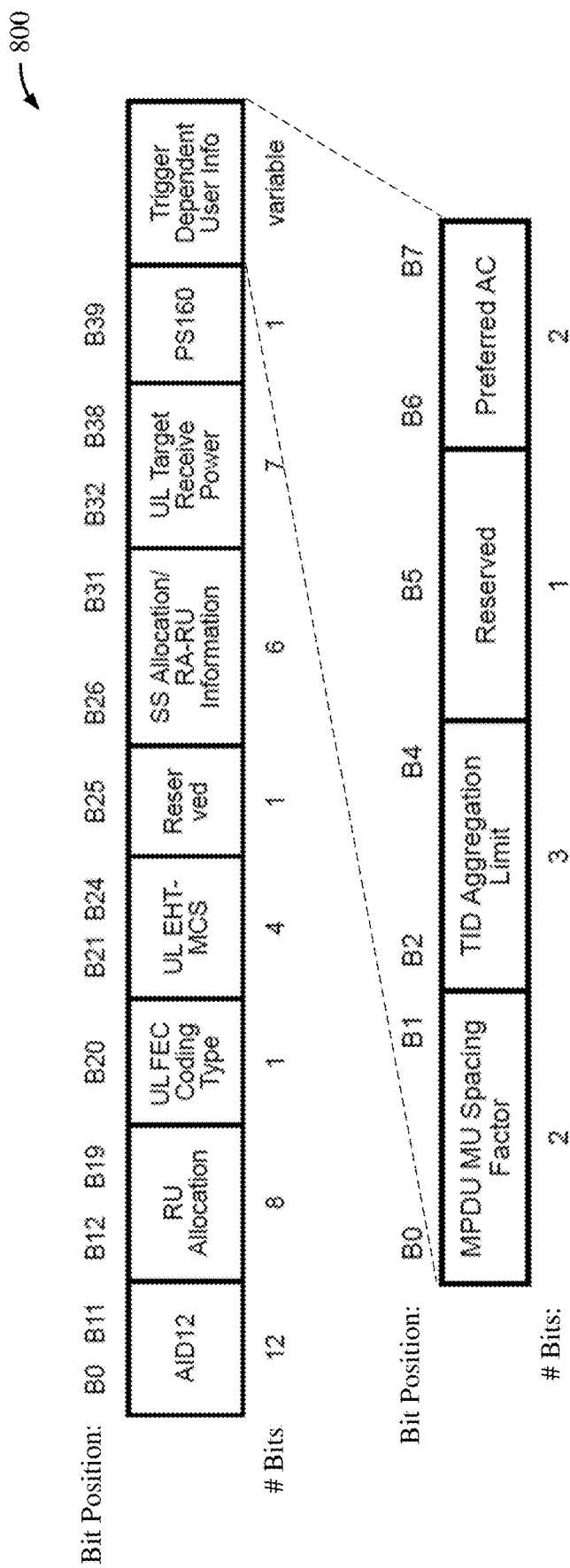
FIG. 8 shows a user information field for a trigger frame formatted in accordance with an existing trigger frame format.

FIG. 8 shows an example user information field 800 for a trigger frame formatted in accordance with an existing trigger frame format. More specifically, the user information field 800 conforms to the Extremely High Throughput (EHT) variant user information field format defined by an initial release of the IEEE 802.11be amendment of the IEEE 802.11 standard. With reference for example to FIG. 7, the user information field 800 may be one example of the user information field 732. Each user information field in a user information list is identified by a respective association identifier (AID) value in the AID12 subfield (in bit positions B0-B11). In some aspects, the AID value may uniquely identify a particular STA (or user) in a BSS. As shown in FIG. 8, the user information field 800 includes two reserved bits (in bit position B25 of the user information field 800 and bit position B5 of the trigger dependent user information subfield).

In some implementations, any number of the reserved bits in the user information field 800 may be repurposed to carry the tone distribution information 736. In some other implementations, only the reserved bit in bit position B5 of the trigger dependent user information subfield may be repurposed to carry the tone distribution information 736. In some aspects, a reserved bit of the user information field 800 may be replaced by a distributed transmission bit (or subfield) in future releases or versions of the IEEE 802.11 standard. For example, a first value of the distributed transmission bit (such as "1") may indicate that the logical RU (or MRU) allocated to a particular user or STA maps to an rRU. On the other hand, a second value of the distributed transmission bit (such as "0") may indicate that the logical RU (or MRU) allocated to a particular user or STA maps to a dRU.

The user information field 800 also includes an RU allocation subfield (in bit positions B12-B19) and a PS160 subfield (in bit position B39). A combined value of the RU allocation subfield and the PS160 subfield maps to an entry in an RU allocation table. The RU allocation table is a lookup table that stores a number of entries representing respective RU or MRU allocations. Specifically, each entry in the RU allocation table may indicate a bandwidth, an RU/MRU size, and an RU/MRU index. In some implementations, the RU allocation information may include the value of the RU allocation subfield. In some aspects, any entry in the RU allocation table may be allocated for distributed transmissions. In some other aspects, only a subset of the entries in the RU allocation table may be allocated for distributed transmissions (such as 26-tone, 52-tone, 106-tone, and 242-tone RUs).

Figure 9:
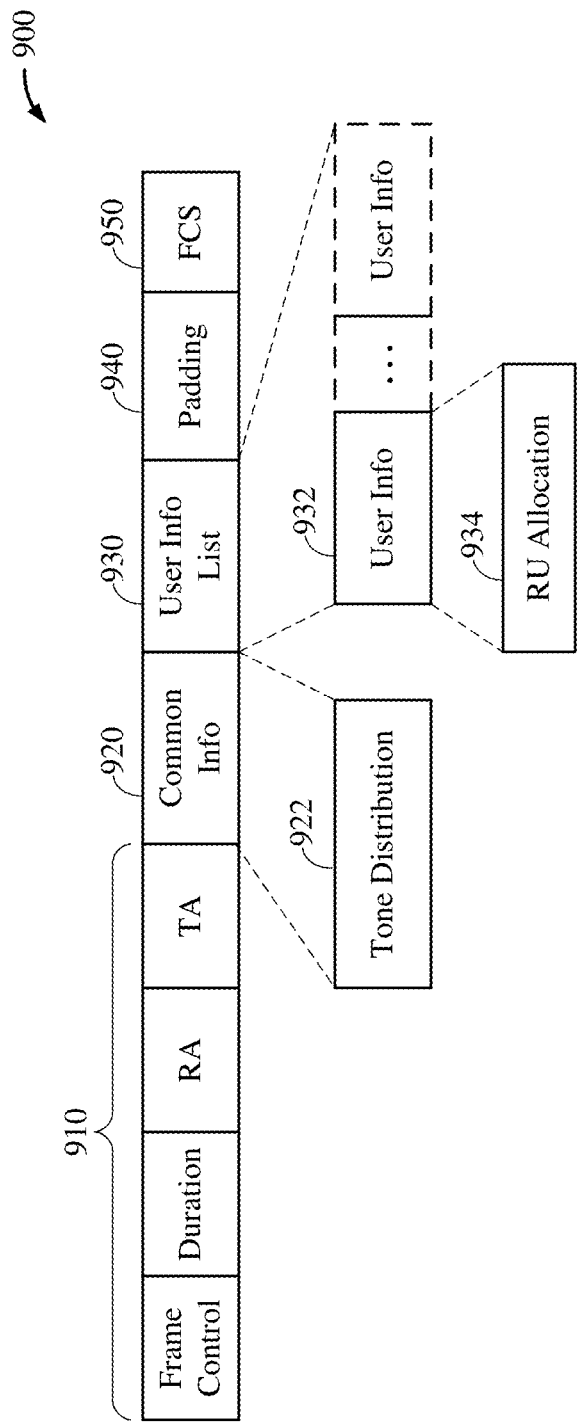
FIG. 9 shows another example trigger frame usable for communications between an AP and a number of STAs according to some implementations.

FIG. 9 shows another example trigger frame 900 usable for communications between an AP and a number of STAs according to some implementations. The trigger frame 900 may be used to solicit a TB PPDU from one or more STAs. With reference for example to FIG. 1, the AP 102 may transmit the trigger frame 900 to one or more of the STAs 104 to solicit a TB PPDU from the STAs. The trigger frame 900 may allocate one or more logical RUs (or MRUs) for transmission in the TB PPDU. In some implementations, each of the logical RUs may map to an rRU. In some other implementations, each of the logical RUs may map to a dRU. Still further, in some implementations, the logical RUs may map to a combination of rRUs and dRUs.

The trigger frame 900 includes a MAC header 910, a common information field 920, a user information list 930, zero or more padding bits 940, and an FCS 950. The MAC header 910 includes a frame control field, a duration field, a receiver address (RA) field, and a transmitter address (TA) field. The common information field 920 and user information list 930 carry configuration information which may be used by a receiving device to configure a TB PPDU to be transmitted in response to receiving the trigger frame 900. In some aspects, the user information list 930 may include one or more user information fields 932 each carrying per-user information for a respective user. For example, each user information field 932 may carry RU allocation information 934 indicating a logical RU (or MRU) that is allocated for transmission in the TB PPDU. As described above, the logical RU represents a number (N) of tones on which a particular user or STA can transmit the TB PPDU.

The common information field 920 may carry information that is common to all recipients of the trigger frame 900. In some implementations, the common information field 920 may carry tone distribution information 922 indicating whether the logical RUs (or MRUs) allocated by the trigger frame 900 are for a contiguous transmission or a distributed transmission. In other words, the tone distribution information 922 indicates whether each logical RU maps to an rRU or a dRU. In some aspects, the tone distribution information 922 may be indicated by the value of a distributed transmission bit. As such, the value of the distributed transmission bit may apply to all user information fields in the user information list 930. In some other aspects, the tone distribution information 922 may include a bitmap. Specifically, each bit of the bitmap may represent a respective subchannel of a given wireless channel. As such, some subchannels may be configured for contiguous transmissions while some other subchannels may be configured for distributed transmissions.

Figure 10:
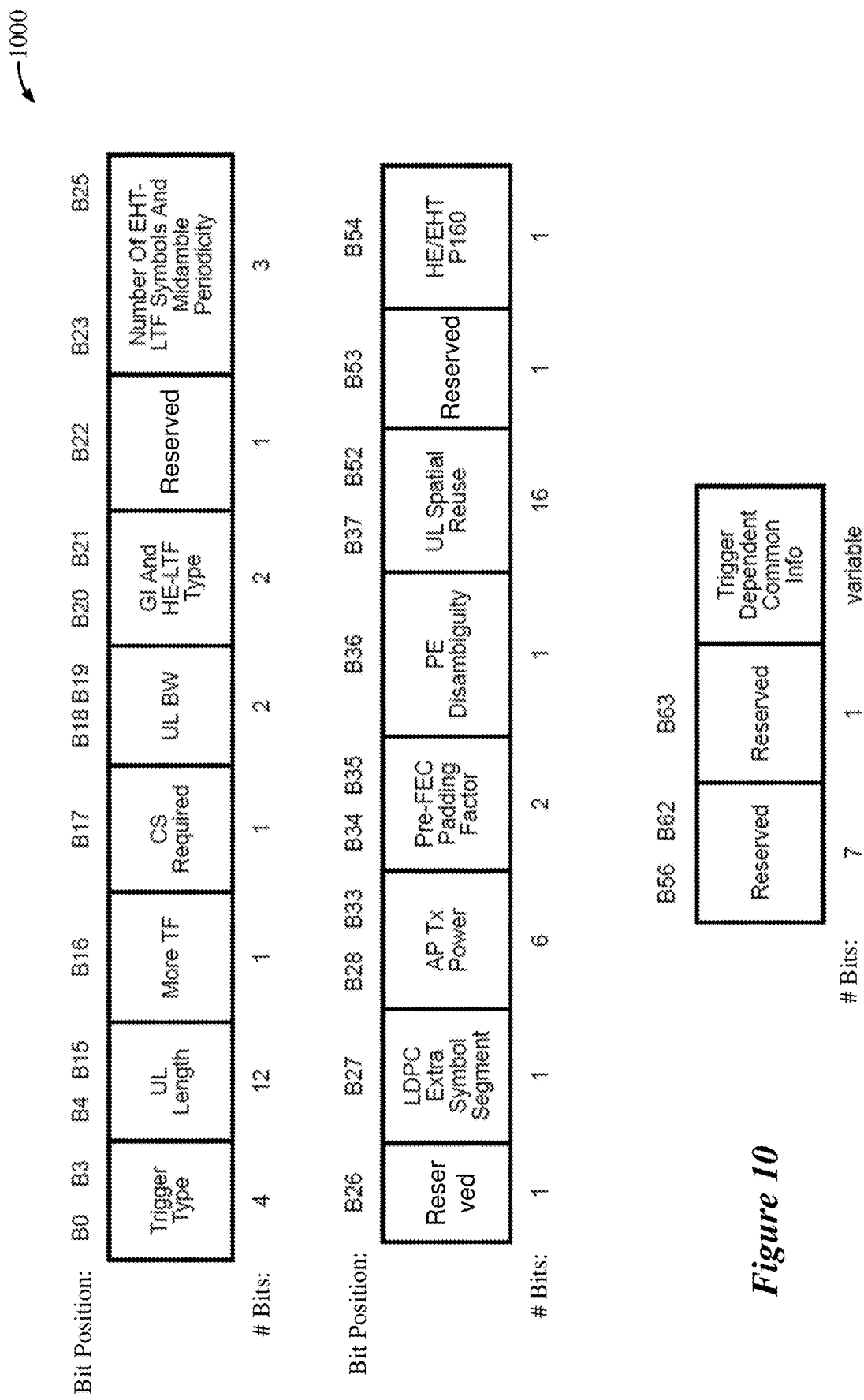
FIG. 10 shows a common information field for a trigger frame formatted in accordance with an existing trigger frame format.

FIG. 10 shows a common information field 1000 for a trigger frame formatted in accordance with an existing trigger frame format. More specifically, the common information field 1000 conforms to the EHT variant common information field format defined by an initial release of the IEEE 802.11be amendment of the IEEE 802.11 standard. With reference for example to FIG. 9, the common information field 1000 may be one example of the common field 920. In the example of FIG. 10, the common information field 1000 may be included in a trigger frame that is configured to solicit an EHT TB PPDU. Thus, the common information field 1000 includes a total of 11 reserved bits (in bit positions B22, B26, B53, B56-B62, and B63).

In some implementations, any number of the reserved bits may be repurposed to carry the tone distribution information 922. In some other implementations, only a subset of the 9 reserved bits in bit positions B56-B62 may be repurposed to carry the tone distribution information 922. In some aspects, a reserved bit of the common information field 1000 may be replaced by a distributed transmission bit (or subfield) in future releases or versions of the IEEE 802.11 standard. For example, a first value of the distributed transmission bit (such as "1") may indicate that the TB PPDU only supports contiguous transmissions. In other words, each logical RU (or MRU) allocated for transmission in the TB PPDU maps to an rRU. On the other hand, a second value of the distributed transmission bit (such as "0") may indicate that the TB PPDU only supports distributed transmissions. In other words, each logical RU (or MRU) allocated for transmission in the TB PPDU maps to a dRU.

In some other aspects, multiple reserved bits of the common information field 1000 may be replaced by a bitmap in future releases or versions of the IEEE 802.11 standard. For example, the value of each bit of the bitmap may indicate whether a respective subchannel of a wireless channel is configured for contiguous transmissions or distributed transmissions. In some aspects, the bitmap may be 4 bits in length, where each bit represents a respective 80 MHz subchannel of a 320 MHz channel. As such, the value of each bit may indicate whether each logical RU (or MRU) allocated within a respective 80 MHz subchannel maps to an rRU or a dRU. In some other aspects, the bitmap may be 8 bits in length, where each bit represents a respective 40 MHz subchannel of a 320 MHz channel. As such, the value of each bit may indicate whether each logical RU (or MRU) allocated within a respective 40 MHz subchannel maps to an rRU or a dRU.

In some other aspects, the bitmap may be 4 bits in length, where each bit represents a respective 20 MHz subchannel of an 80 MHz channel. As such, the value of each bit may indicate whether each logical RU (or MRU) allocated within a respective 20 MHz subchannel maps to an rRU or a dRU. In some other aspects, the bitmap may be 8 bits in length, where each bit represents a respective 20 MHz subchannel of a 160 MHz channel. As such, the value of each bit may indicate whether each logical RU (or MRU) allocated within a respective 20 MHz subchannel maps to an rRU or a dRU.

Figure 11:
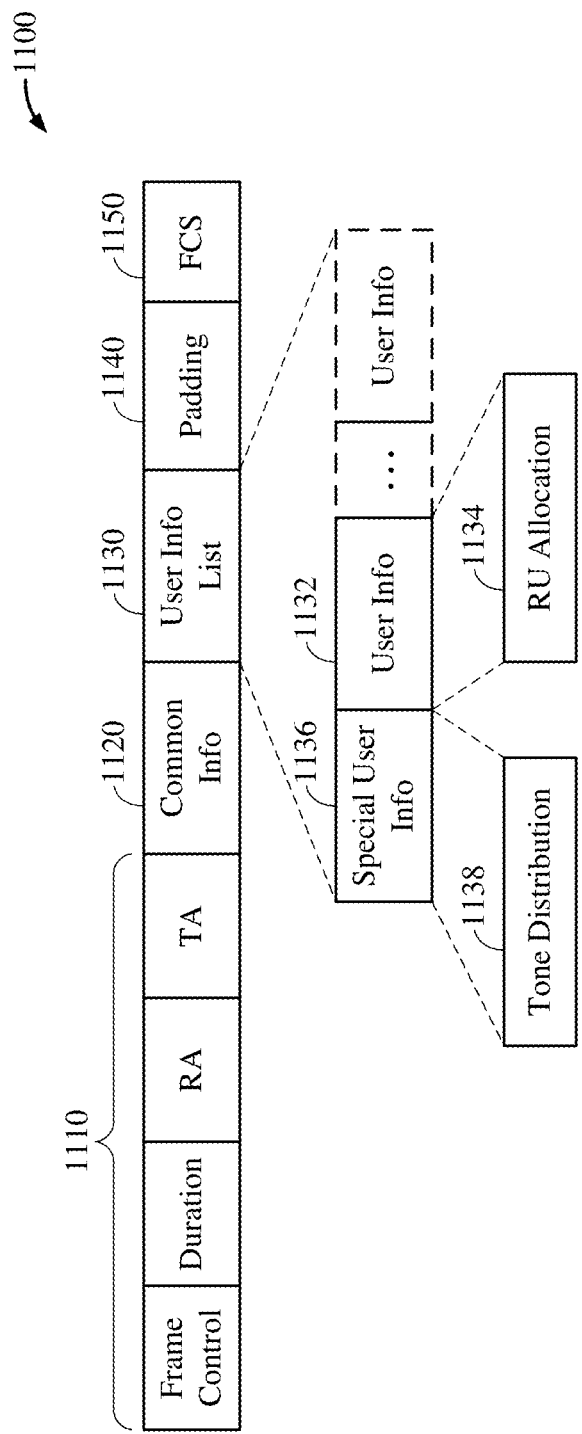
FIG. 11 shows another example trigger frame usable for communications between an AP and a number of STAs according to some implementations.

FIG. 11 shows another example trigger frame 1100 usable for communications between an AP and a number of STAs according to some implementations. The trigger frame 1100 may be used to solicit a TB PPDU from one or more STAs. With reference for example to FIG. 1, the AP 102 may transmit the trigger frame 1100 to one or more of the STAs 104 to solicit a TB PPDU from the STAs. The trigger frame 1100 may allocate one or more logical RUs (or MRUs) for transmission in the TB PPDU. In some implementations, each of the logical RUs may map to an rRU. In some other implementations, each of the logical RUs may map to a dRU. Still further, in some implementations, the logical RUs may map to a combination of rRUs and dRUs.

The trigger frame 1100 includes a MAC header 1110, a common information field 1120, a user information list 1130, zero or more padding bits 1140, and an FCS 1150. The MAC header 1110 includes a frame control field, a duration field, a receiver address (RA) field, and a transmitter address (TA) field. The common information field 1120 and user information list 1130 carry configuration information which may be used by a receiving device to configure a TB PPDU to be transmitted in response to receiving the trigger frame 1100. In some aspects, the user information list 1130 may include one or more user information fields 1132 each carrying per-user information for a respective user. For example, each user information field 1132 may carry RU allocation information 1134 indicating a logical RU (or MRU) that is allocated for transmission in the TB PPDU. As described above, the logical RU represents a number (N) of tones on which a particular user or STA can transmit the TB PPDU.

In some implementations, the user information list 1130 may further include a special user information field 1136. As described with reference to FIG. 8, each of the user information fields 1132 is identified by a unique AID value assigned to a particular STA (or user) in a BSS. In contrast, a special user information field 1136 may be identified by an AID value that is not assigned to any STA in the BSS. In some aspects, the special user information field 1136 may be an extension of the common information field 1120. In other words, the special user information field 1136 also may carry information that is common to all users associated with the trigger frame. In some implementations, the special user information field 1136 may carry tone distribution information 1138 indicating whether the logical RUs (or MRUs) allocated by the trigger frame 1100 are for a contiguous transmission or a distributed transmission. In other words, the tone distribution information 1138 indicates whether each logical RU maps to an rRU or a dRU. In some aspects, the tone distribution information 1138 may be indicated by the value of a distributed transmission bit. In some other aspects, the tone distribution information 1138 may include a bitmap, where each bit of the bitmap represents a respective subchannel of a given wireless channel.

Figure 12:
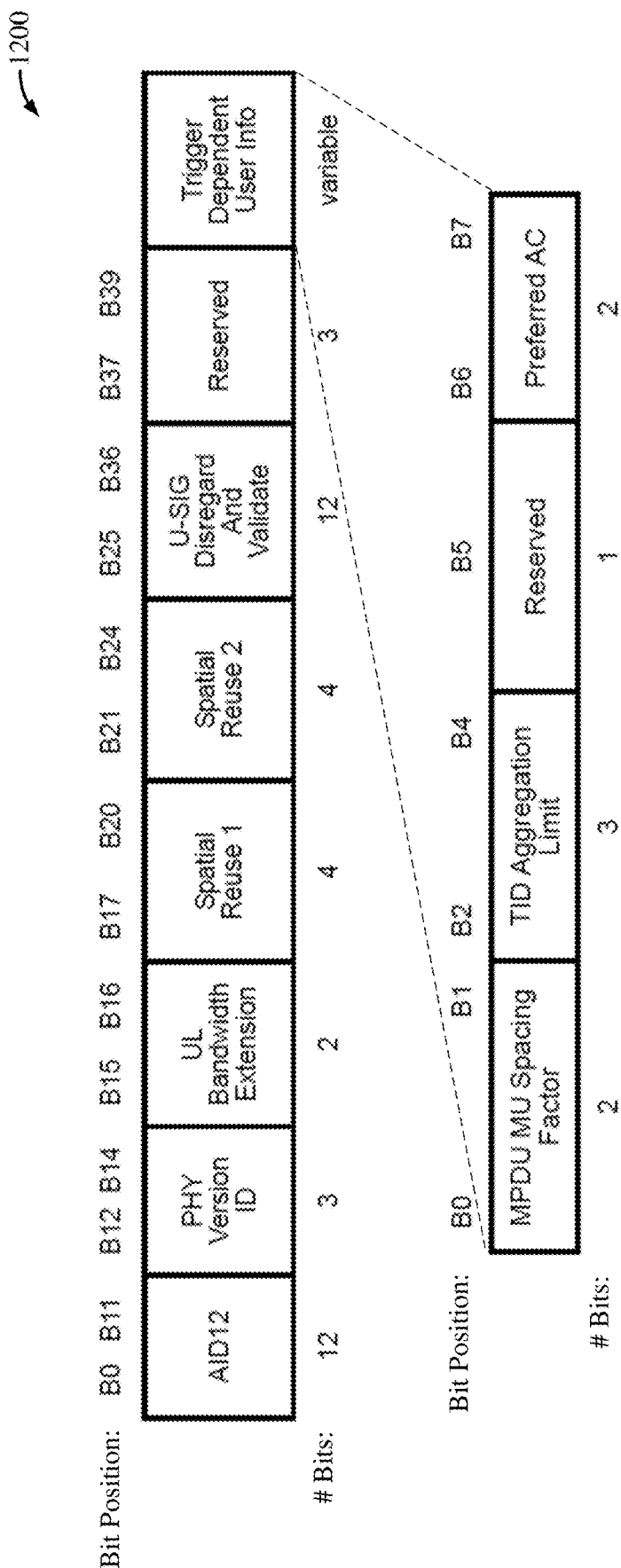
FIG. 12 shows a special user information field for a trigger frame formatted in accordance with an existing trigger frame format.

FIG. 12 shows a special user information field 1200 for a trigger frame formatted in accordance with an existing trigger frame format. More specifically, the special user information field 1200 conforms to the special user information field format defined by an initial release of the IEEE 802.11be amendment of the IEEE 802.11 standard. Thus, the AID12 subfield (in bit positions B0-B11) may carry an AID value equal to 2007. With reference for example to FIG. 11, the special user information field 1200 may be one example of the special user information field 1136. More specifically, the special user information field 1200 may be an extension of a common information field of the underlying trigger frame (such as the common information field 1120). In the example of FIG. 12, the special user information field 1200 may include a total of 4 reserved bits (in bit position B37-B39 of the special user information field 1200 and bit position B5 of the trigger dependent user information field) and 12 U-SIG disregard and validate bits (in bit positions B25-B36).

In some implementations, any number of the reserved bits in the special user information field 1200 may be repurposed to carry the tone distribution information 1138. In some other implementations, the tone distribution information 1138 may be carried by one or more of the U-SIG disregard and validate bits (such as to carry over the tone distribution information 1138 to the U-SIG of the TB PPDU). In some aspects, a reserved bit of the special user information field 1200 may be replaced by a distributed transmission bit (or subfield) in future releases or versions of the IEEE 802.11 standard. For example, the value of the distributed transmission bit may indicate whether the TB PPDU supports contiguous transmissions or distributed transmissions. In some other aspects, multiple reserved bits of the special user information field 1200 may be replaced by a bitmap (such as a 4-bit bitmap) in future releases or versions of the IEEE 802.11 standard. For example, the value of each bit of the bitmap may indicate whether a respective subchannel of a wireless channel is configured for contiguous transmissions or distributed transmissions.

As described above, the tone distribution information may be carried in a trigger frames to allocate one or more dRUs for transmission in a TB PPDU. In other words, the tone distribution information facilitates distributed transmissions of TB PPDUs by one or more STAs. Although the AP may be aware of the tone mapping used to transmit the TB PPDU (by virtue of transmitting the trigger frame), neighboring devices that do not receive the trigger frame cannot interpret the tone distribution information therein. However, some neighboring devices may need to measure out-of-band emissions (OOBE) or detect intra-RU or inter-RU interference caused by the PPDU. Moreover, an AP or STA also may increase its per-tone transmit power through distributed transmission of PPDUs to one or more STAs (such as MU PPDUs). Thus, in some implementations, the PHY preamble of a PPDU may carry distributed signaling information indicating whether the PPDU is transmitted as a contiguous transmission or a distributed transmission.

Figure 13:
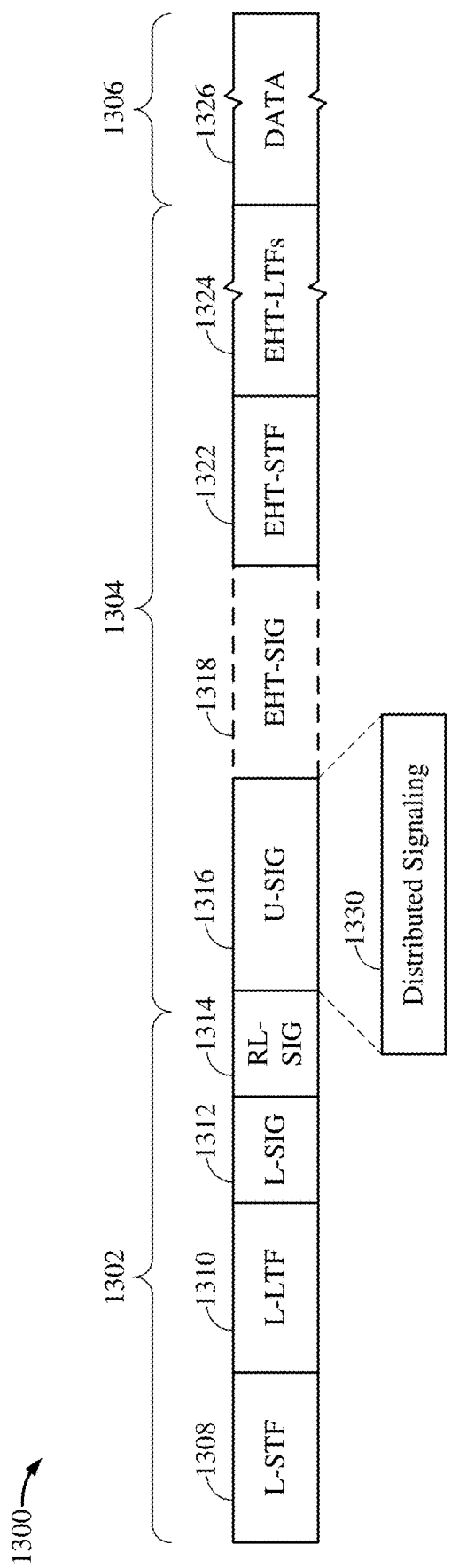
FIG. 13 shows an example PPDU usable for communications between a STA and an AP according to some implementations.

FIG. 13 shows an example PPDU 1300 usable for communications between a STA and an AP according to some implementations. The PPDU 1300 includes a PHY preamble including a first portion 1302 and a second portion 1304. The PPDU 1300 may further include a PHY payload 1306 after the preamble, for example, in the form of a PSDU carrying a DATA field 1326. In some implementations, the PPDU 1300 may be formatted as a non-legacy or Extremely High Throughput (EHT) PPDU. The first portion 1302 of the PHY preamble includes L-STF 1308, L-LTF 1310, and L-SIG 1312. The second portion 1304 of the PHY preamble includes a repeated legacy signal field (RL-SIG) 1314, a universal signal field (U-SIG) 1316, a non-legacy short training field (EHT-STF) 1322, and a number of non-legacy long training fields (EHT-LTFs) 1324. In some implementations, the second portion 1304 may further include a non-legacy signal field (EHT-SIG) 1318. Specifically, EHT-SIG 1318 is present only in single-user (SU) and multi-user (MU) PPDU formats.

In the IEEE 802.11be amendment, and future generations of the IEEE 802.11 standard, new fields may be used to carry signaling information. At least some of the new fields and signaling information may be included in U-SIG 1316. For example, U-SIG 1316 may include signaling regarding types or formats of additional signal fields that may follow U-SIG 1316. Such signaling may be carried in one or more version-independent fields and one or more version-dependent fields. The version-independent fields may include, for example, a version identifier subfield carrying information indicating a version of the associated wireless communication protocol and a PPDU bandwidth subfield carrying information indicating a bandwidth associated with the PPDU 1300. The version-dependent fields may carry information used for interpreting other fields of U-SIG 1316 (or EHT-SIG 1318).

In some implementations, U-SIG 1316 may carry distributed signaling information 1330. The distributed signaling information 1330 may indicate whether the PPDU 1300 is transmitted as a contiguous transmission or a distributed transmission. In some aspects, the distributed signaling information 1330 may be indicated by the value of a distributed signaling bit. As such, the value of the distributed signaling bit may apply to the entire bandwidth of the PPDU 1300. In other words, the entire PPDU 1300 may be transmitted as a contiguous transmission or a distributed transmission. In some other aspects, the distributed signaling information 1330 may include a bitmap. Specifically, each bit of the bitmap may represent a respective subchannel of a given wireless channel. As such, some portions of the PPDU 1300 may be transmitted as contiguous transmissions (on one or more subchannels) and some other portions of the PPDU 1300 may be transmitted as distributed transmissions (on the remaining subchannels).

Figure 14:
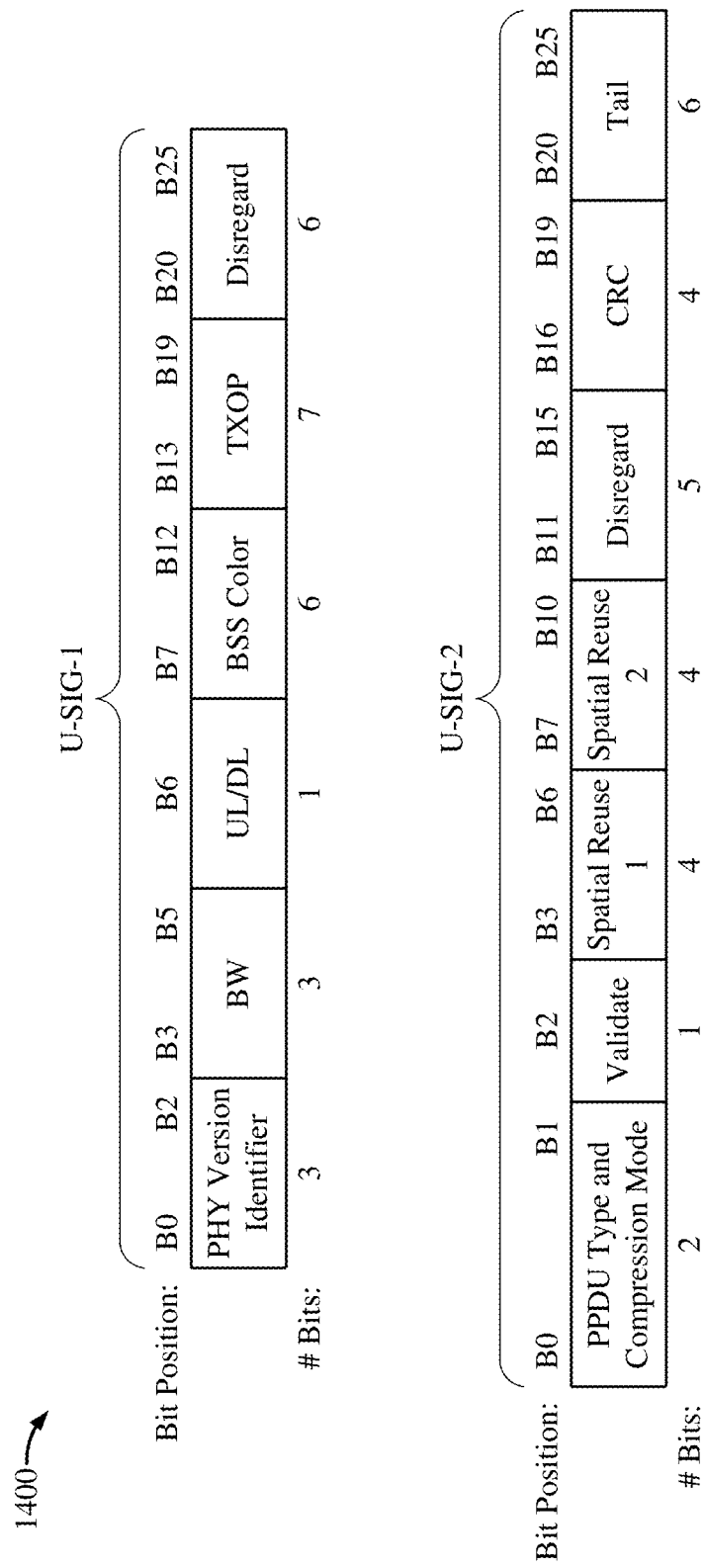
FIG. 14 shows a universal signal field (U-SIG) for a PPDU formatted in accordance with an existing PPDU format.

FIG. 14 shows a U-SIG 1400 for a PPDU formatted in accordance with an existing PPDU format. More specifically, U-SIG 1400 conforms to the U-SIG format for an EHT TB PPDU defined by an initial release of the IEEE 802.11be amendment of the IEEE 802.11 standard. With reference for example to FIG. 14, U-SIG 1400 may be one example of U-SIG 1316. In accordance with the EHT TB PPDU format, reserved bits are further subdivided into validate bits and disregard bits. The validate bits are used to indicate whether a STA should continue receiving the PPDU whereas the disregard bits may be ignored by the receiving STA. As shown in FIG. 14, U-SIG 1400 includes 1 validate bit and 11 disregard bits distributed across two U-SIG symbols (U-SIG-1 and U-SIG-2). More specifically, U-SIG 1400 includes 6 disregard bits in U-SIG-1 (in bit positions B20-B25), 5 disregard bits in U-SIG-2 (in bit positions B11-B15), and 1 validate bit in U-SIG-2 (in bit position B2). In some implementations, any number of the validate or disregard bits may be repurposed to carry the distributed signaling information 1330.

In some other implementations, only the validate bit may be repurposed to carry the distributed signaling information 1330. In such implementations, the validate bit may be replaced by a distributed signaling bit (or subfield) in future releases or version of the IEEE 802.11 standard. For example, a first value of the distributed signaling bit (such as "1") may indicate that the PPDU is transmitted as a contiguous transmission. In other words, the PPDU is transmitted as a contiguous transmission across the entire bandwidth of the wireless channel. On the other hand, a second value of the distributed transmission bit (such as "0") may indicate that the PPDU is transmitted as a distributed transmission. In other words, the PPDU is transmitted as a distributed transmission across the entire bandwidth of the wireless channel. As such, legacy STAs that do not support distributed transmissions can stop processing the PPDU (and conserve power) when the value of the distributed signaling bit indicates a distributed transmission.

In some other implementations, only the disregard bits may be repurposed to carry the distributed signaling information 1330. In such implementations, multiple disregard bits may be replaced by a bitmap in future releases or versions of the IEEE 802.11 standard. For example, the value of each bit of the bitmap may indicate whether a respective portion of the PPDU, coinciding with a respective subchannel of a wireless channel, is transmitted as a contiguous transmission or distributed transmission. In other words, the bitmap may indicate whether each logical RU (or MRU) allocated for transmission in the PPDU maps to an rRU or a dRU. As such, a legacy STA that does not support distributed transmissions can continue processing the PPDU if it is assigned an rRU. In some aspects, the bitmap may be 4 bits in length, where each bit represents a respective 80 MHz subchannel of a 320 MHz channel. As such, the value of each bit may indicate whether each logical RU (or MRU) allocated within a respective 80 MHz subchannel maps to an rRU or a dRU. In some other aspects, the bitmap may be 8 bits in length, where each bit represents a respective 40 MHz subchannel of a 320 MHz channel. As such, the value of each bit may indicate whether each logical RU (or MRU) allocated within a respective 40 MHz subchannel maps to an rRU or a dRU.

Figure 15:
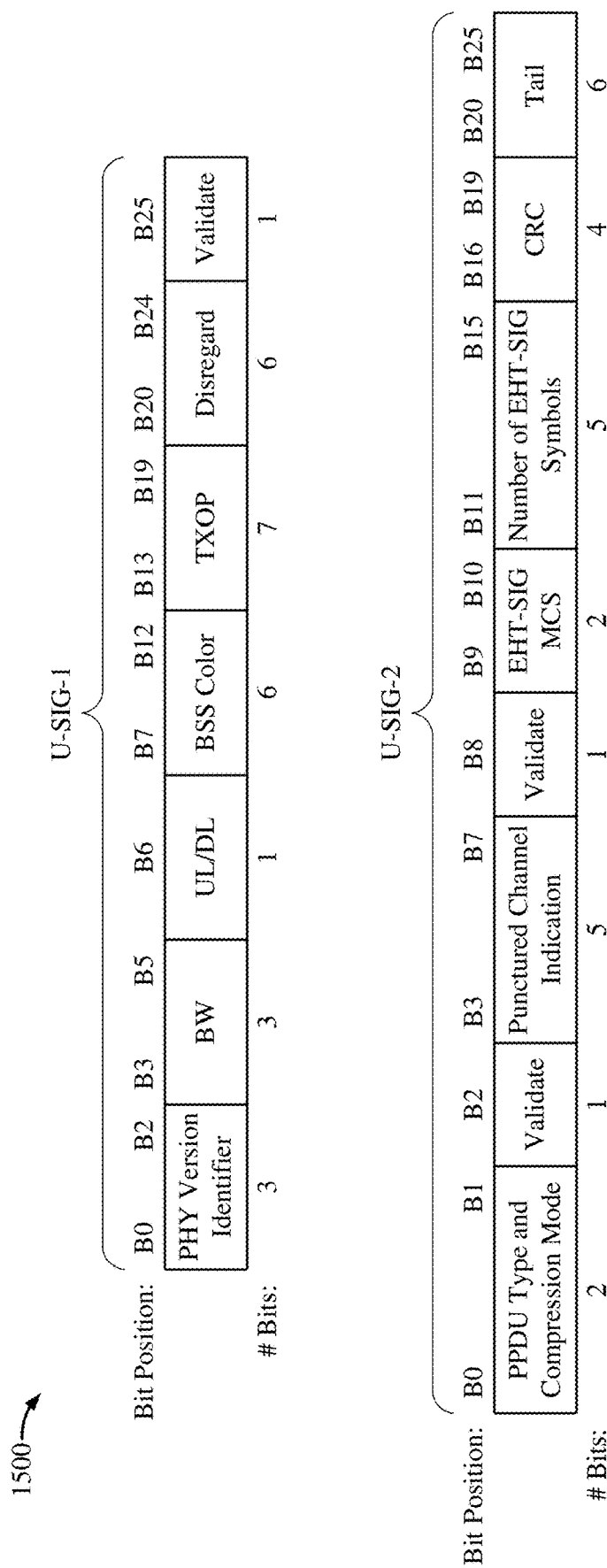
FIG. 15 shows another U-SIG for a PPDU formatted in accordance with an existing PPDU format.

In some other aspects, the bitmap may be 4 bits in length, where each bit represents a respective 20 MHz subchannel of an 80 MHz channel. As such, the value of each bit may indicate whether each logical RU (or MRU) allocated within a respective 20 MHz subchannel maps to an rRU or a dRU. In some other aspects, the bitmap may be 8 bits in length, where each bit represents a respective 20 MHz subchannel of a 160 MHz channel. As such, the value of each bit may indicate whether each logical RU (or MRU) allocated within a respective 20 MHz subchannel maps to an rRU or a dRU FIG. 15 shows another U-SIG 1500 for a PPDU formatted in accordance with an existing PPDU format. More specifically, U-SIG 1500 conforms to the U-SIG format for an EHT MU PPDU defined by an initial release of the IEEE 802.11be amendment of the IEEE 802.11 standard. With reference for example to FIG. 13, U-SIG 1500 may be one example of U-SIG 1316. In accordance with the EHT MU PPDU format, reserved bits are further subdivided into validate bits and disregard bits. As described above, validate bits are used to indicate whether a STA should continue receiving the PPDU whereas the disregard bits may be ignored by the receiving STA. As shown in FIG. 15, U-SIG 1500 includes 3 validate bits and 5 disregard bits distributed across two U-SIG symbols (U-SIG-1 and U-SIG-2). More specifically, U-SIG 1500 includes 5 disregard bits in U-SIG-1 (in bit positions B20-B24), 1 validate bit in U-SIG-1 (in bit positions B25), and 2 validate bits in U-SIG-2 (in bit positions B2 and B8). In some implementations, any number of the validate or disregard bits may be repurposed to carry the distributed signaling information 1330.

In some other implementations, only the validate bits may be repurposed to carry the distributed signaling information 1330. In such implementations, one of the validate bits may be replaced by a distributed signaling bit (or subfield) in future releases or version of the IEEE 802.11 standard. As such, legacy STAs that do not support distributed transmissions can stop processing the PPDU (and conserve power) when the value of the distributed signaling indicates a distributed transmission. In some other implementations, only the disregard bits may be repurposed to carry the distributed signaling information 1330. In such implementations, multiple disregard bits may be replaced by a bitmap in future releases or versions of the IEEE 802.11 standard. For example, the value of each bit of the bitmap may indicate whether a respective portion of the PPDU, coinciding with a respective subchannel of a wireless channel, is transmitted as a contiguous transmission or distributed transmission (such as described with reference to FIG. 14). As such, a legacy STA that does not support distributed transmissions can continue processing the PPDU if it is assigned an rRU.

Figure 16:
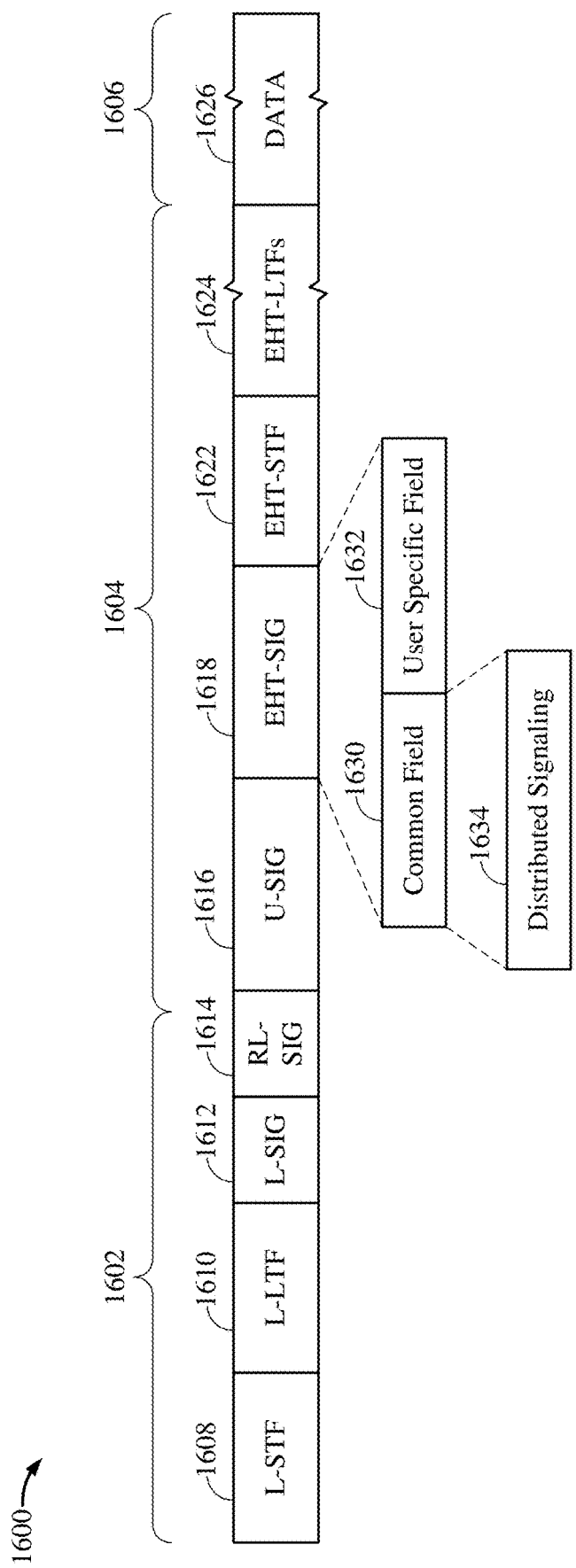
FIG. 16 shows another example PPDU usable for communications between a STA and an AP according to some implementations.

FIG. 16 shows an example PPDU 1600 usable for communications between a STA and an AP according to some implementations. The PPDU 1600 includes a PHY preamble including a first portion 1602 and a second portion 1604. The PPDU 1600 may further include a PHY payload 1606 after the preamble, for example, in the form of a PSDU carrying a DATA field 1626. In some implementations, the PPDU 1600 may be formatted as a non-legacy or EHT PPDU. The first portion 1602 of the PHY preamble includes L-STF 1608, L-LTF 1610, and L-SIG 1612. The second portion 1604 of the PHY preamble includes an RL-SIG 1614, a U-SIG 1616, an EHT-SIG 1618, an EHT-STF 1622, and a number of EHT-LTFs 1624. The EHT-SIG 1618 may further include a common field 1630 and a user specific field 1632. The common field 1630 may include U-SIG overflow representing one or more bits or fields overflowed from U-SIG 1616 or an RU allocation subfield carrying information indicating an allocation of RUs for intended recipients of the PPDU 1600. The user specific field 1632 may include a number of user fields carrying per-user information for intended recipients of the PPDU 1600.

In some implementations, EHT-SIG 1618 may carry distributed signaling information 1634. More specifically, in the example of FIG. 16, the distributed signaling information 1634 may be carried in the common field 1630. The distributed signaling information 1634 may indicate whether the PPDU 1600 is transmitted as a contiguous transmission or a distributed transmission. In some aspects, the distributed signaling information 1634 may be indicated by the value of a distributed signaling bit. As such, the value of the distributed signaling bit may apply to the entire bandwidth of the PPDU 1600. In other words, the entire PPDU 1600 may be transmitted as a contiguous transmission or a distributed transmission. In some other aspects, the distributed signaling information 1634 may include a bitmap. Specifically, each bit of the bitmap may represent a respective subchannel of a given wireless channel. As such, some portions of the PPDU 1600 may be transmitted as contiguous transmissions (on one or more subchannels) and some other portions of the PPDU 1600 may be transmitted as distributed transmissions (on the remaining subchannels).

FIG. 17 shows a common field 1700 for a PPDU formatted in accordance with an existing PPDU format. More specifically, the common field 1700 conforms to the common field format for an OFDMA transmission or a non-OFDMA transmission defined by an initial release of the IEEE 802.11be amendment of the IEEE 802.11 standard. In the example of FIG. 17, only the first 7 subfields (in bit positions B0-B16) of the common field 1700 are shown for simplicity. The contents of the remaining subfields (in bit positions B17-B17+N) depend on whether the common field 1700 is for an OFDMA transmission or a non-OFDMA transmission. With reference for example to FIG. 16, the common field 1700 may be one example of the common field 1630 of EHT-SIG 1618. As shown in FIG. 17, the common field 1700 includes 4 disregard bits (in bit positions B13-B16). As described above, disregard bits may be ignored by the receiving STA. In some implementations, any number of the disregard bits may be repurposed to carry the distributed signaling information 1634.

In some aspects, one of the validate bits may be replaced by a distributed signaling bit (or subfield) in future releases or version of the IEEE 802.11 standard. For example, a first value of the distributed signaling bit (such as "1") may indicate that the PPDU is transmitted as a contiguous transmission. On the other hand, a second value of the distributed transmission bit (such as "0") may indicate that the PPDU is transmitted as a distributed transmission. In some other aspects, multiple disregard bits may be replaced by a bitmap in future releases or versions of the IEEE 802.11 standard. For example, the value of each bit of the bitmap may indicate whether a respective portion of the PPDU, coinciding with a respective subchannel of a wireless channel, is transmitted as a contiguous transmission or distributed transmission (such as described with reference to FIG. 14).

Figure 18:
FIG. 18 shows another common field for a PPDU formatted in accordance with an existing PPDU format.

FIG. 18 shows another common field 1800 for a PPDU formatted in accordance with an existing PPDU format. More specifically, the common field 1800 conforms to the common field format for an EHT sounding null data packet (NDP) defined by an initial release of the IEEE 802.11be amendment of the IEEE 802.11 standard. With reference for example to FIG. 16, the common field 1800 may be one example of the common field 1630 of EHT-SIG 1618. As shown in FIG. 18, the common field 1800 includes 2 disregard bits (in bit positions B14 and B15). As described above, disregard bits may be ignored by the receiving STA. In some implementations, any number of the disregard bits may be repurposed to carry the distributed signaling information 1634.

In some aspects, one of the validate bits may be replaced by a distributed signaling bit (or subfield) in future releases or version of the IEEE 802.11 standard. For example, a first value of the distributed signaling bit (such as "1") may indicate that the PPDU is transmitted as a contiguous transmission. On the other hand, a second value of the distributed transmission bit (such as "0") may indicate that the PPDU is transmitted as a distributed transmission. In some other aspects, multiple disregard bits may be replaced by a bitmap in future releases or versions of the IEEE 802.11 standard. For example, the value of each bit of the bitmap may indicate whether a respective portion of the PPDU, coinciding with a respective subchannel of a wireless channel, is transmitted as a contiguous transmission or distributed transmission (such as described with reference to FIG. 14).

Figure 19:
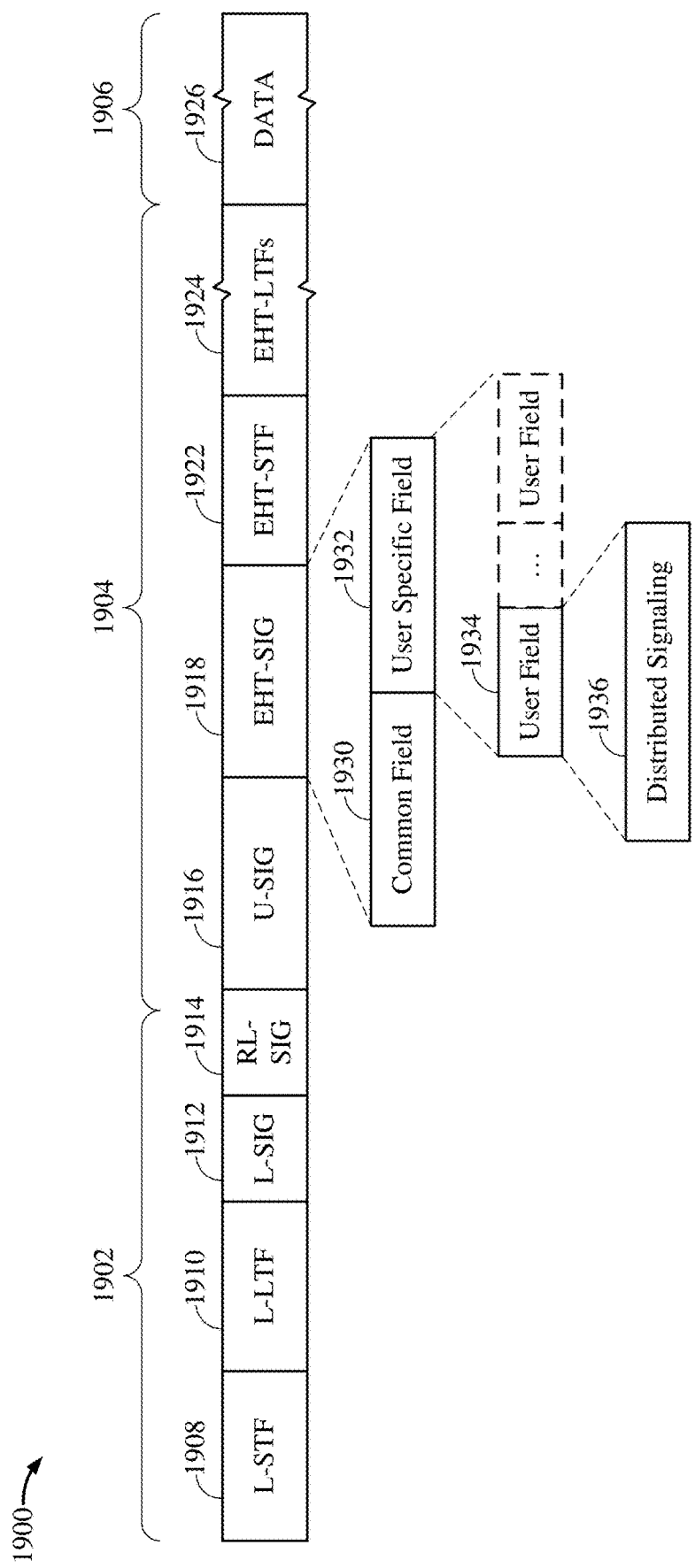
FIG. 19 shows another example PPDU usable for communications between a STA and an AP according to some implementations.

FIG. 19 shows an example PPDU 1900 usable for communications between a STA and an AP according to some implementations. The PPDU 1900 includes a PHY preamble including a first portion 1902 and a second portion 1904. The PPDU 1900 may further include a PHY payload 1906 after the preamble, for example, in the form of a PSDU carrying a DATA field 1926. In some implementations, the PPDU 1900 may be formatted as a non-legacy or EHT PPDU. The first portion 1902 of the PHY preamble includes L-STF 1908, L-LTF 1910, and L-SIG 1912. The second portion 1904 of the PHY preamble includes an RL-SIG 1914, a U-SIG 1916, an EHT-SIG 1918, an EHT-STF 1922, and a number of EHT-LTFs 1924. The EHT-SIG 1918 may further include a common field 1930 and a user specific field 1932. The common field 1930 may include U-SIG overflow representing one or more bits or fields overflowed from U-SIG 1916 or an RU allocation subfield carrying information indicating an allocation of RUs for intended recipients of the PPDU 1900. The user specific field 1932 may include one or more user fields 1934 carrying per-user information for intended recipients of the PPDU 1900.

In some implementations, EHT-SIG 1918 may carry distributed signaling information 1936. More specifically, in the example of FIG. 19, the distributed signaling information 1936 may be carried in each user field 1934 of the user specific field 1932. The distributed signaling information 1936 may indicate whether the PPDU 1900 is transmitted as a contiguous transmission or a distributed transmission. In some aspects, the distributed signaling information 1936 may be indicated by the value of a distributed signaling bit. Because the user specific field 1932 may include multiple user fields 1934, the distributed signaling information 1936 may apply only to the RU (or MRU) allocated to the particular user field 1934 carrying the distributed signaling information 1936.

Figure 20:
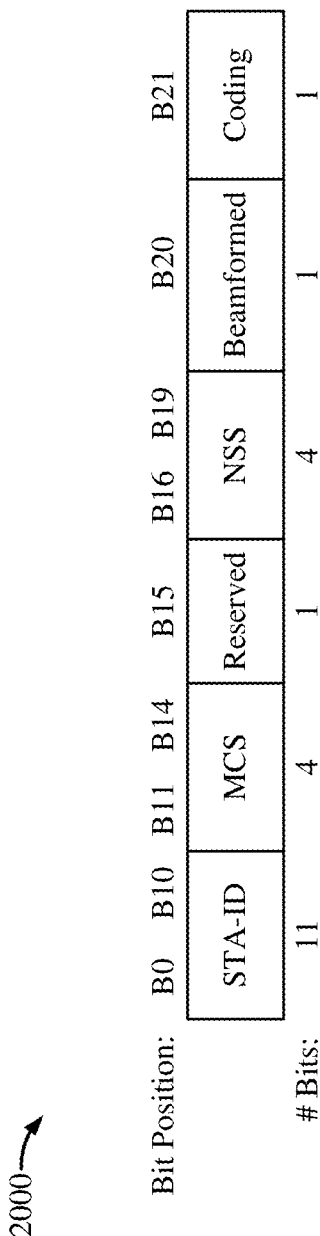
FIG. 20 shows a user field for a PPDU formatted in accordance with an existing PPDU format.

FIG. 20 shows a user field 2000 for a PPDU formatted in accordance with an existing PPDU format. More specifically, the user field 2000 conforms to the user field format for a non-MU-MIMO allocation defined by an initial release of the IEEE 802.11be amendment of the IEEE 802.11 standard. With reference for example to FIG. 19, the user field 1900 may be one example of a user field in the user specific field 1932 of EHT-SIG 1918. As shown in FIG. 20, the user field 2000 includes 1 reserved bit (in bit position B15). In some implementations, the reserved bit may be repurposed to carry the distributed signaling information 1936. In some aspects, the reserved bit may be replaced by a distributed signaling bit (or subfield) in future releases or version of the IEEE 802.11 standard. For example, a first value of the distributed signaling bit (such as "1") may indicate that its assigned RU (or MRU) is transmitted as a contiguous transmission. On the other hand, a second value of the distributed transmission bit (such as "0") may indicate that its assigned RU (or MRU) is transmitted as a distributed transmission.

Figure 21:
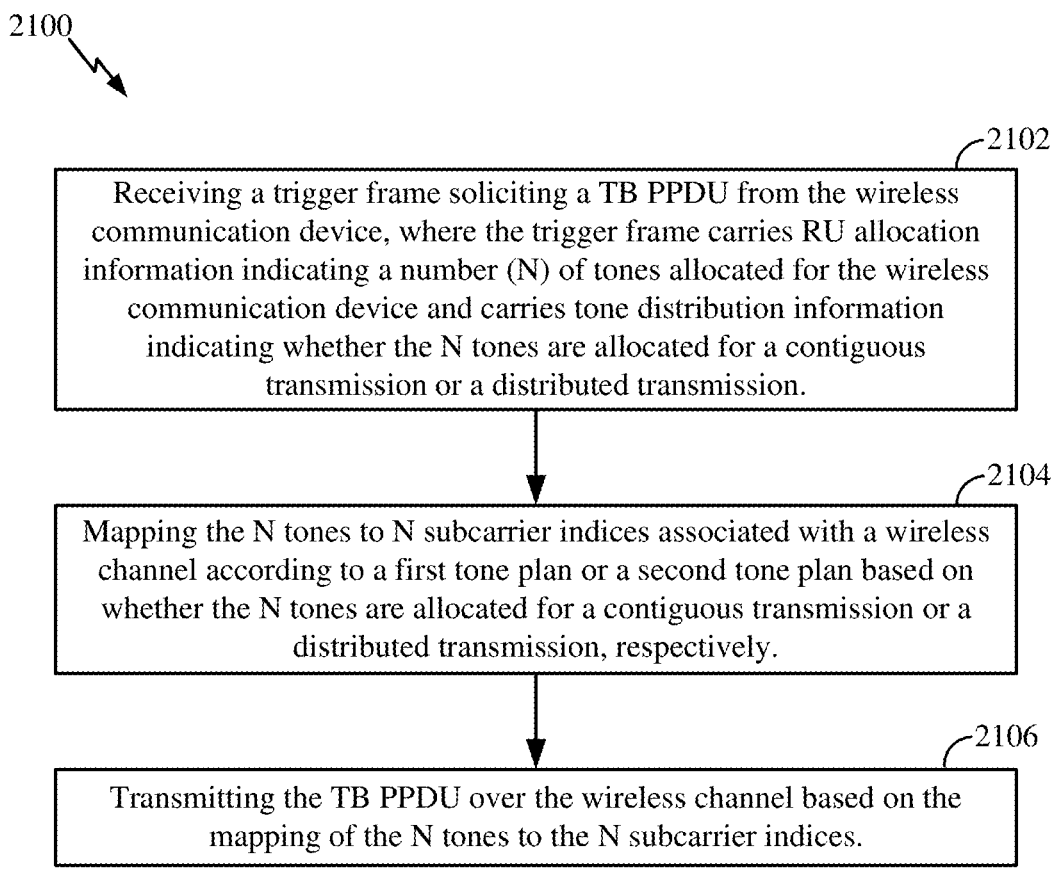
FIG. 21 shows a flowchart illustrating an example process for wireless communication that distributed resource unit (RU) signaling according to some implementations.

FIG. 21 shows a flowchart illustrating an example process 2100 for wireless communication that supports distributed RU signaling according to some implementations. In some implementations, the process 2100 may be performed by a wireless communication device operating as or within a network node, such as one of the STAs 104 or 504 described above with reference to FIGS. 1 and 5B, respectively.

In some implementations, the process 2100 begins in block 2102 with receiving a trigger frame soliciting a TB PPDU from the wireless communication device, where the trigger frame carries RU allocation information indicating a number (N) of tones allocated for the wireless communication device and carries tone distribution information indicating whether the N tones are allocated for a contiguous transmission or a distributed transmission. In some implementations, the RU allocation information and the tone distribution information may be carried in a user information field that carries information specific to the wireless communication device. In some aspects, the RU allocation information may be indicated by a value of an RU allocation subfield of the user information field and the tone distribution information may be indicated by a value of a distributed transmission bit.

In some other implementations, the RU allocation information may be carried in a user information field and the tone distribution information may be carried in a common information field, or a special user information field, that carries information common to each user associated with the trigger frame. In some aspects, the RU allocation information may be indicated by a value of an RU allocation subfield of the user information field and the tone distribution information may be indicated by a value of a distributed transmission bit. In some other aspects, the RU allocation information may be indicated by a value of an RU allocation subfield of the user information field and the tone distribution information may comprise a bitmap, where each bit of the bitmap indicates whether a respective subchannel of the wireless channel is allocated for contiguous transmissions or distributed transmissions.

In block 2104, the process 2100 proceeds with mapping the N tones to N subcarrier indices associated with a wireless channel according to a first tone plan or a second tone plan based on whether the N tones are allocated for a contiguous transmission or a distributed transmission, respectively. For example, the N tones may represent one or more RUs. In some implementations, each of the one or more RUs may be mapped to a respective set of contiguous subcarrier indices according to the first tone plan. In some other implementations, each of the one or more RUs may be mapped to noncontiguous subcarrier indices according to the second tone plan.

In block 2106, the process 2100 proceeds with transmitting the TB PPDU over the wireless channel based on the mapping of the N tones to the N subcarrier indices. In some implementations, the TB PPDU may include a physical layer preamble having a U-SIG that carries distributed signaling information indicating whether the N tones are allocated for a contiguous transmission or a distributed transmission.

Figure 22:
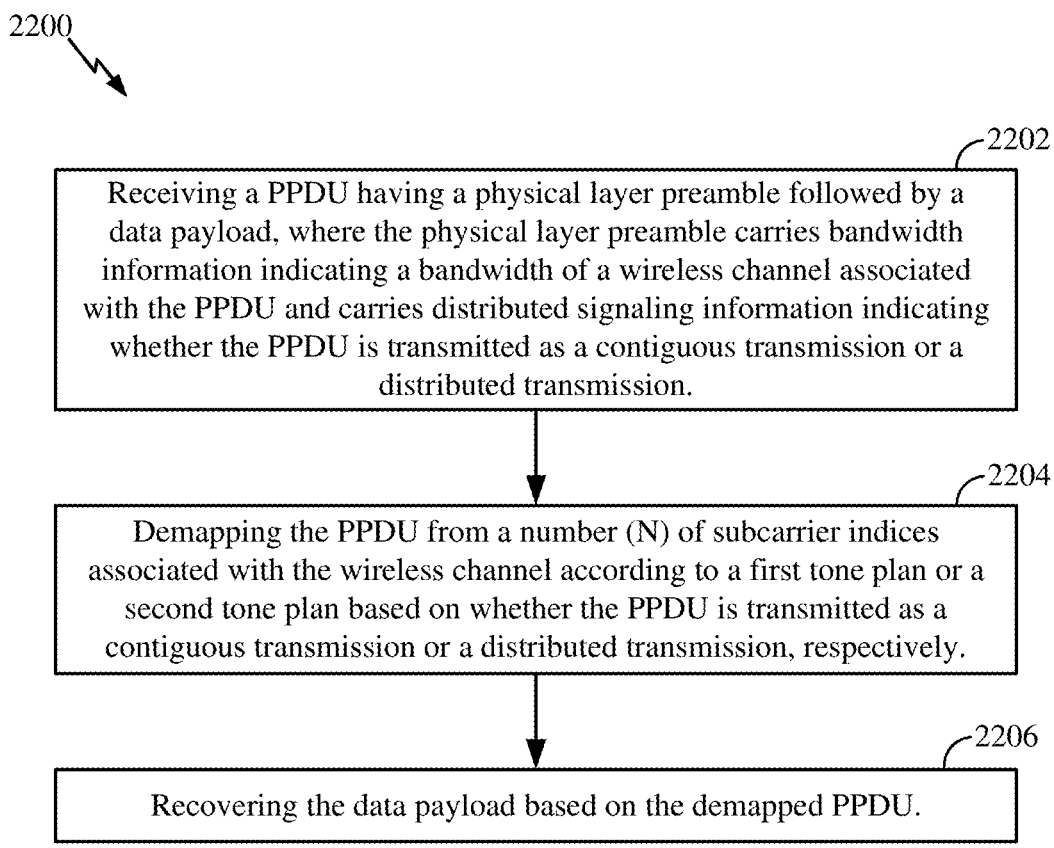
FIG. 22 shows a flowchart illustrating an example process for wireless communication that distributed RU signaling according to some implementations.

FIG. 22 shows a flowchart illustrating an example process 2200 for wireless communication that supports distributed RU signaling according to some implementations. In some implementations, the process 2200 may be performed by a wireless communication device operating as or within an AP such as one of the APs 102 or 502 of FIGS. 1 and 5A, respectively.

In some implementations, the process 2200 begins in block 2202 with receiving a PPDU having a physical layer preamble followed by a data payload, where the physical layer preamble carries bandwidth information indicating a bandwidth of a wireless channel associated with the PPDU and carries distributed signaling information indicating whether the PPDU is transmitted as a contiguous transmission or a distributed transmission. In some implementations, the distributed signaling information may be indicated by a value of a distributed signaling bit. In some other implementations, the distributed signaling information may comprise a bitmap, where each bit of the bitmap indicates whether a respective subchannel of the wireless channel is associated with contiguous transmissions or distributed transmissions.

In some implementations, the distributed signaling information may be carried in a U-SIG that carries information for interpreting one or more subsequent fields of the physical layer preamble. In some other implementations, the distributed signaling information may be carried in a common field of a non-legacy signal field that immediately follows a U-SIG in the physical layer preamble, where the common field carries information common to each user associated with the PPDU. Still further, in some implementations, the distributed signaling information may be carried in a user field of a non-legacy signal field that immediately follows a U-SIG in the physical layer preamble, where the user field carries information specific to the wireless communication device.

In block 2204, the process 2200 proceeds with demapping the PPDU from a number (N) of subcarrier indices associated with the wireless channel according to a first tone plan or a second tone plan based on whether the PPDU is transmitted as a contiguous transmission or a distributed transmission, respectively. In some implementations, the PPDU may be demapped from one or more sets of contiguous subcarrier indices according to the first tone plan, where each of the one or more sets of contiguous subcarrier indices represents a respective RU. In some other implementations, the PPDU may be demapped from noncontiguous subcarrier indices according to the second tone plan. In block 2206, the process 2200 proceeds with recovering the data payload based on the demapped PPDU.

In some implementations, the process 2200 may further include transmitting a trigger frame soliciting the PPDU, where the trigger frame carries tone distribution information indicating whether the wireless channel is allocated for a contiguous transmission or a distributed transmission, and where the PPDU being received responsive to the trigger frame.

Figure 23:
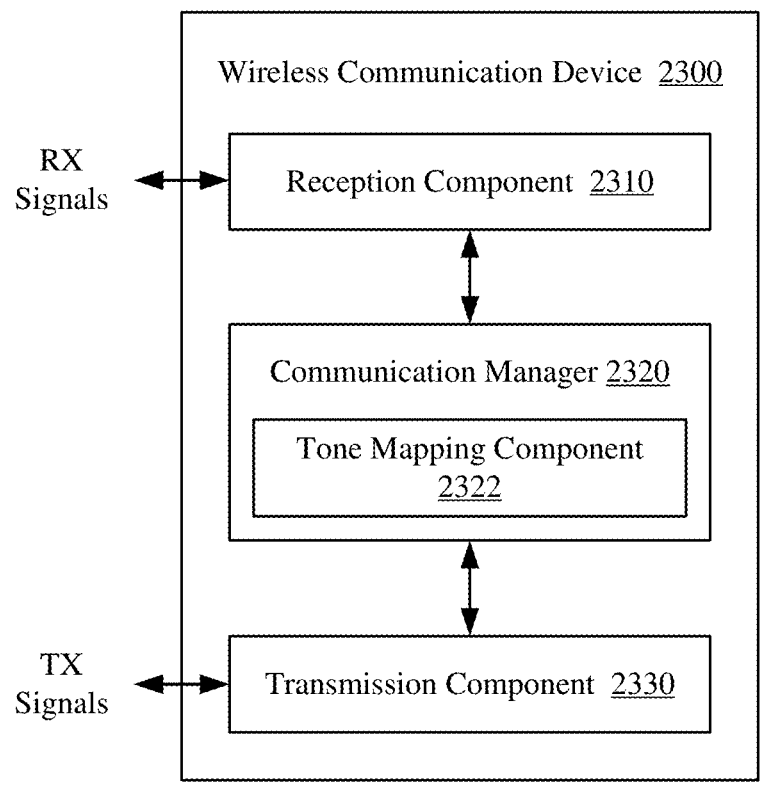
FIG. 23 shows a block diagram of an example wireless communication device according to some implementations.

FIG. 23 shows a block diagram of an example wireless communication device 2300 according to some implementations. In some implementations, the wireless communication device 2300 is configured to perform the process 2100 described above with reference to FIG. 21. The wireless communication device 2300 can be an example implementation of the wireless communication device 400 described above with reference to FIG. 4. For example, the wireless communication device 2300 can be a chip, SoC, chipset, package or device that includes at least one processor and at least one modem (for example, a Wi-Fi (IEEE 802.11) modem or a cellular modem).

The wireless communication device 2300 includes a reception component 2310, a communication manager 2320, and a transmission component 2330. The communication manager 2320 further includes a tone mapping component 2322. Portions of the tone mapping component 2322 may be implemented at least in part in hardware or firmware. In some implementations, the tone mapping component 2322 is implemented at least in part as software stored in a memory (such as the memory 408). For example, portions of the tone mapping component 2322 can be implemented as non-transitory instructions (or "code") executable by a processor (such as the processor 406) to perform the functions or operations of the respective component.

The reception component 2310 is configured to receive RX signals, over a wireless channel, from one or more other wireless communication devices. In some implementations, the reception component 2310 may receive a trigger frame that solicits a TB PPDU from the wireless communication device 2300, where the trigger frame carries RU allocation information indicating a number (N) of tones allocated for the wireless communication device 2300 and carrying tone distribution information indicating whether the N tones are allocated for a contiguous transmission or a distributed transmission. The communication manager 2320 is configured to control or manage communications with the one or more other wireless communication devices. In some implementations, the tone mapping component 2322 may map the N tones to N subcarrier indices associated with a wireless channel according to a first tone plan or a second tone plan based on whether the N tones are allocated for a contiguous transmission or a distributed transmission, respectively. The transmission component 2330 is configured to transmit TX signals, over the wireless channel, to one or more other wireless communication devices. In some implementations, the transmission component 2330 may transmit the TB PPDU over the wireless channel based on the mapping of the N tones to the N subcarrier indices.

Figure 24:
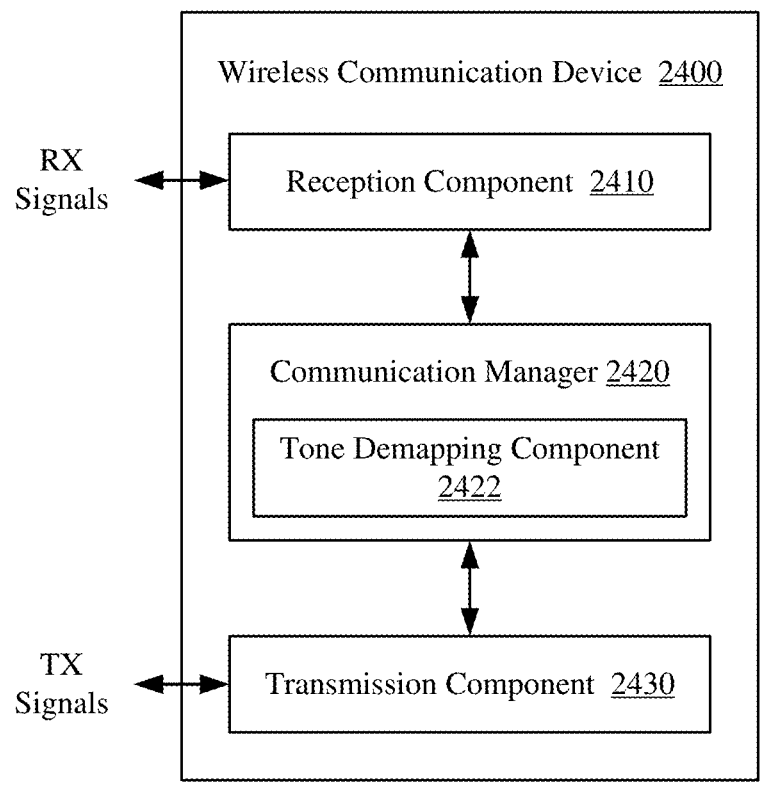
FIG. 24 shows a block diagram of an example wireless communication device according to some implementations.

FIG. 24 shows a block diagram of an example wireless communication device 2400 according to some implementations. In some implementations, the wireless communication device 2400 is configured to perform the process 2200 described above with reference to FIG. 22. The wireless communication device 2400 can be an example implementation of the wireless communication device 400 described above with reference to FIG. 4. For example, the wireless communication device 2400 can be a chip, SoC, chipset, package or device that includes at least one processor and at least one modem (for example, a Wi-Fi (IEEE 802.11) modem or a cellular modem).

The wireless communication device 2400 includes a reception component 2410, a communication manager 2420, and a transmission component 2430. The communication manager 2420 further includes a tone demapping component 2422. Portions of the tone demapping component 2422 may be implemented at least in part in hardware or firmware. In some implementations, the tone demapping component 2422 is implemented at least in part as software stored in a memory (such as the memory 408). For example, portions of the tone demapping component 2422 can be implemented as non-transitory instructions (or "code") executable by a processor (such as the processor 406) to perform the functions or operations of the respective component.

The reception component 2410 is configured to receive RX signals, over a wireless channel, from one or more other wireless communication devices. In some implementations, the reception component 2410 may receive a PPDU having a physical layer preamble followed by a data payload, where the physical layer preamble carries bandwidth information indicating a bandwidth of a wireless channel associated with the PPDU and carries distributed signaling information indicating whether the PPDU is transmitted as a contiguous transmission or a distributed transmission. The communication manager 2420 is configured to control or manage communications with the one or more other wireless communication devices. In some implementations, the tone demapping component 2422 may demap the PPDU from a number (N) of subcarrier indices associated with the wireless channel according to a first tone plan or a second tone plan based on whether the PPDU is transmitted as a contiguous transmission or a distributed transmission, respectively, and recover the data payload based on the demapped PPDU. The transmission component 2430 is configured to transmit TX signals, over the wireless channel, to one or more other wireless communication devices. In some implementations, the transmission component 2430 may transmit a trigger frame soliciting the PPDU from the other wireless communication devices.

Implementation examples are described in the following numbered clauses:

1. A method for wireless communication by a wireless communication device, including:
   receiving a trigger frame soliciting a trigger-based (TB) physical layer convergence protocol (PLCP) protocol data unit (PPDU) from the wireless communication device, the trigger frame carrying resource unit (RU) allocation information indicating a number (N) of tones allocated for the wireless communication device and carrying tone distribution information indicating whether the N tones are allocated for a contiguous transmission or a distributed transmission;
   mapping the N tones to N subcarrier indices associated with a wireless channel according to a first tone plan or a second tone plan based on whether the N tones are allocated for a contiguous transmission or a distributed transmission, respectively; and
   transmitting the TB PPDU over the wireless channel based on the mapping of the N tones to the N subcarrier indices.
2. The method of clause 1, where the N tones represent one or more RUs.
3. The method of any of clauses 1 or 2, where each of the one or more RUs is mapped to a respective set of contiguous subcarrier indices according to the first tone plan.
4. The method of any of clauses 1 or 2, where each of the one or more RUs is mapped to noncontiguous subcarrier indices according to the second tone plan.
5. The method of any of clauses 1-4, where the RU allocation information and the tone distribution information are carried in a user information field that carries information specific to the wireless communication device.
6. The method of any of clauses 1-5, where the RU allocation information is indicated by a value of an RU allocation subfield of the user information field and the tone distribution information is indicated by a value of a distributed transmission bit.
7. The method of any of clauses 1-4, where the RU allocation information is carried in a user information field and the tone distribution information is carried in a common information field, or a special user information field, that carries information common to each user associated with the trigger frame.
8. The method of any of clauses 1-4 or 7, where the RU allocation information is indicated by a value of an RU allocation subfield of the user information field and the tone distribution information is indicated by a value of a distributed transmission bit.
9. The method of any of clauses 1-4 or 7, where the RU allocation information is indicated by a value of an RU allocation subfield of the user information field and the tone distribution information includes a bitmap, each bit of the bitmap indicating whether a respective subchannel of the wireless channel is allocated for contiguous transmissions or distributed transmissions.
10. The method of any of clauses 1-9, where the TB PPDU includes a physical layer preamble having a universal signal field (U-SIG) that carries distributed signaling information indicating whether the N tones are mapped to the N subcarrier indices according to the first tone plan or the second tone plan.
11. A wireless communication device including:
    at least one modem;
    at least one processor communicatively coupled with the at least one modem; and
    at least one memory communicatively coupled with the at least one processor and storing processor-readable code that, when executed by the at least one processor in conjunction with the at least one modem, is configured to perform the method of any one or more of clauses 1-10.
12. A method for wireless communication performed by a wireless communication device, including:
    receiving a physical layer convergence protocol (PLCP) protocol data unit (PPDU) having a physical layer preamble followed by a data payload, the physical layer preamble carrying bandwidth information indicating a bandwidth of a wireless channel associated with the PPDU and carrying distributed signaling information indicating whether the PPDU is transmitted as a contiguous transmission or a distributed transmission; and
    demapping the PPDU from a number (N) of subcarrier indices associated with the wireless channel according to a first tone plan or a second tone plan based on whether the PPDU is transmitted as a contiguous transmission or a distributed transmission, respectively; and
    recovering the data payload based on the demapped PPDU.
13. The method of clause 12, where the PPDU is demapped from one or more sets of contiguous subcarrier indices according to the first tone plan, each of the one or more sets of contiguous subcarrier indices representing a respective resource unit (RU).
14. The method of clause 12, where the PPDU is demapped from noncontiguous subcarrier indices according to the second tone plan.
15. The method of any of clauses 12-14, where the distributed signaling information is indicated by a value of a distributed signaling bit.
16. The method of any of clauses 12-14, where the distributed signaling information includes a bitmap, each bit of the bitmap indicating whether a respective subchannel of the wireless channel is associated with contiguous transmissions or distributed transmissions.
17. The method of any of clauses 12-16, where the distributed signaling information is carried in a universal signal field (U-SIG) that carries information for interpreting one or more subsequent fields of the physical layer preamble.
18. The method of any of clauses 12-16, where the distributed signaling information is carried in a common field of a non-legacy signal field that immediately follows a U-SIG in the physical layer preamble, the common field carrying information common to each user associated with the PPDU.
19. The method of any of clauses 12-16, where the distributed signaling information is carried in a user field of a non-legacy signal field that immediately follows a U-SIG in the physical layer preamble, the user field carrying information specific to the wireless communication device.

20. The method of any of clauses 12-19, further including: transmitting a trigger frame soliciting the PPDU, the trigger frame carrying tone distribution information indicating whether the wireless channel is allocated for a contiguous transmission or a distributed transmission, the PPDU being received responsive to the trigger frame.

21. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 12-20.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
receiving a trigger frame soliciting a trigger-based (TB) physical layer convergence protocol (PLCP) protocol data unit (PPDU) from the wireless communication device, the trigger frame carrying resource unit (RU) allocation information indicating a number (N) of tones allocated for the wireless communication device and carrying tone distribution information indicating whether the N tones are allocated for a contiguous transmission or a distributed transmission;
mapping the N tones to N subcarrier indices associated with a wireless channel according to a first tone plan or a second tone plan based on whether the N tones are allocated for the contiguous transmission or the distributed transmission, respectively, wherein the first tone plan indicates to the wireless communication device to map the N tones to a set of contiguous subcarrier indices, and wherein the second tone plan indicates to the wireless communication device to map the N tones to noncontiguous subcarrier indices; and
transmitting the TB PPDU over the wireless channel based on the mapping of the N tones to the N subcarrier indices.

2. The method of claim 1, wherein the N tones represent one or more RUs.

3. The method of claim 2, wherein each of the one or more RUs is mapped to a respective set of contiguous subcarrier indices according to the first tone plan.

4. The method of claim 2, wherein each of the one or more RUs is mapped to the noncontiguous subcarrier indices according to the second tone plan.

5. The method of claim 1, wherein the RU allocation information and the tone distribution information are carried in a user information field that carries information specific to the wireless communication device.

6. The method of claim 5, wherein the RU allocation information is indicated by a value of an RU allocation subfield of the user information field and the tone distribution information is indicated by a value of a distributed transmission bit.

7. The method of claim 1, wherein the RU allocation information is carried in a user information field and the tone distribution information is carried in a common information field, or a special user information field, that carries information common to each user associated with the trigger frame.

8. The method of claim 7, wherein the RU allocation information is indicated by a value of an RU allocation subfield of the user information field and the tone distribution information is indicated by a value of a distributed transmission bit.

9. The method of claim 7, wherein the RU allocation information is indicated by a value of an RU allocation subfield of the user information field and the tone distribution information comprises a bitmap, each bit of the bitmap indicating whether a respective subchannel of the wireless channel is allocated for contiguous transmissions or distributed transmissions.

10. The method of claim 1, wherein the TB PPDU includes a physical layer preamble having a universal signal field (U-SIG) that carries distributed signaling information indicating whether the N tones are allocated for the contiguous transmission or the distributed transmission.

11. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive a trigger frame soliciting a trigger-based (TB) physical layer convergence protocol (PLCP) protocol data unit (PPDU) from the wireless communication device, the trigger frame carrying resource unit (RU) allocation information indicating a number (N) of tones allocated for the wireless communication device and carrying tone distribution information indicating whether the N tones are allocated for a contiguous transmission or a distributed transmission;
map the N tones to N subcarrier indices associated with a wireless channel according to a first tone plan or a second tone plan based on whether the N tones are allocated for the contiguous transmission or the distributed transmission, respectively, wherein the first tone plan indicates to the wireless communication device to map the N tones to a set of contiguous subcarrier indices, and wherein the second tone plan indicates to the wireless communication device to map the N tones to noncontiguous subcarrier indices; and
transmit the TB PPDU over the wireless channel based on the mapping of the N tones to the N subcarrier indices.

12. The wireless communication device of claim 11, wherein the N tones represent one or more RUs, each of the one or more RUs being mapped to a respective set of contiguous subcarrier indices according to the first tone plan and mapped to the noncontiguous subcarrier indices according to the second tone plan.

13. The wireless communication device of claim 11, wherein the RU allocation information and the tone distribution information are carried in a user information field that carries information specific to the wireless communication device.

14. The wireless communication device of claim 11, wherein the RU allocation information is carried in a user information field and the tone distribution information is carried in a common information field, or a special user information field, that carries information common to each user associated with the trigger frame.

15. A method for wireless communication performed by a wireless communication device, comprising:
receiving a physical layer convergence protocol (PLCP) protocol data unit (PPDU) having a physical layer preamble followed by a data payload, the physical layer preamble carrying bandwidth information indicating a bandwidth of a wireless channel associated with the PPDU and carrying distributed signaling information indicating whether the PPDU is transmitted as a contiguous transmission or a distributed transmission;
demapping the PPDU from a number (N) of subcarrier indices associated with the wireless channel according to a first tone plan or a second tone plan based on whether the PPDU is transmitted as the contiguous transmission or the distributed transmission, respectively, wherein the PPDU is demapped from one or more sets of contiguous subcarrier indices according to the first tone plan and is demapped from noncontiguous subcarrier indices according to the second tone plan; and
recovering the data payload based on the demapped PPDU.

16. The method of claim 15, wherein each of the one or more sets of contiguous subcarrier indices represents a respective resource unit (RU).

17. The method of claim 15, wherein the distributed signaling information is indicated by a value of a distributed signaling bit.

18. The method of claim 15, wherein the distributed signaling information comprises a bitmap, each bit of the bitmap indicating whether a respective subchannel of the wireless channel is associated with contiguous transmissions or distributed transmissions.

19. The method of claim 15, wherein the distributed signaling information is carried in a universal signal field (U-SIG) that carries information for interpreting one or more subsequent fields of the physical layer preamble.

20. The method of claim 15, wherein the distributed signaling information is carried in a common field of a non-legacy signal field that immediately follows a U-SIG in the physical layer preamble, the common field carrying information common to each user associated with the PPDU.

21. The method of claim 15, wherein the distributed signaling information is carried in a user field of a non-legacy signal field that immediately follows a U-SIG in the physical layer preamble, the user field carrying information specific to the wireless communication device.

22. The method of claim 15, further comprising:
transmitting a trigger frame soliciting the PPDU, the trigger frame carrying tone distribution information indicating whether the wireless channel is allocated for the contiguous transmission or the distributed transmission, the PPDU being received responsive to the trigger frame.

23. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive a physical layer convergence protocol (PLCP) protocol data unit (PPDU) having a physical layer preamble followed by a data payload, the physical layer preamble carrying bandwidth information indicating a bandwidth of a wireless channel associated with the PPDU and carrying distributed signaling information indicating whether the PPDU is transmitted as a contiguous transmission or a distributed transmission;

demap the PPDU from a number (N) of subcarrier indices associated with the wireless channel according to a first tone plan or a second tone plan based on whether the PPDU is transmitted as the contiguous transmission or the distributed transmission, respectively, wherein the PPDU is demapped from one or more sets of contiguous subcarrier indices according to the first tone plan and is demapped from noncontiguous subcarrier indices according to the second tone plan; and recover the data payload based on the demapped PPDU.

24. The wireless communication device of claim 23, wherein each of the one or more sets of contiguous subcarrier indices represents a respective resource unit (RU).

25. The wireless communication device of claim 23, wherein the distributed signaling information is indicated by a value of a distributed signaling bit.

26. The wireless communication device of claim 23, wherein the distributed signaling information comprises a bitmap, each bit of the bitmap indicating whether a respective subchannel of the wireless channel is associated with contiguous transmissions or distributed transmissions.

27. The wireless communication device of claim 23, wherein the distributed signaling information is carried in a universal signal field (U-SIG) that carries information for interpreting one or more subsequent fields of the physical layer preamble.

28. The wireless communication device of claim 23, wherein the distributed signaling information is carried in a common field of a non-legacy signal field that immediately follows a U-SIG in the physical layer preamble, the common field carrying information common to each user associated with the PPDU.

29. The wireless communication device of claim 23, wherein the distributed signaling information is carried in a user field of a non-legacy signal field that immediately follows a U-SIG in the physical layer preamble, the user field carrying information specific to the wireless communication device.

* * * * *